United States Patent
Cong et al.

(10) Patent No.: US 7,034,742 B2
(45) Date of Patent: Apr. 25, 2006

(54) ROAD CURVATURE ESTIMATION AND AUTOMOTIVE TARGET STATE ESTIMATION SYSTEM

(75) Inventors: Shan Cong, Ann Arbor, MI (US); Shi Shen, Farmington Hills, MI (US); Lang Hong, Beavercreek, OH (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 0 days.

(21) Appl. No.: 10/620,749

(22) Filed: Jul. 15, 2003

(65) Prior Publication Data
US 2005/0179580 A1 Aug. 18, 2005

Related U.S. Application Data

(60) Provisional application No. 60/396,211, filed on Jul. 15, 2002.

(51) Int. Cl.
*G01S 13/93* (2006.01)
(52) U.S. Cl. .............. 342/70; 342/72; 342/73; 342/90; 342/107; 342/195
(58) Field of Classification Search ............ 342/70–73, 342/90, 107, 133, 113–115, 159, 160–162, 342/189, 195, 196; 701/300, 301
See application file for complete search history.

(56) References Cited

U.S. PATENT DOCUMENTS

| | | | |
|---|---|---|---|
| 2,709,804 A | 5/1955 | Chance et al. | 342/96 |
| 3,177,485 A | 4/1965 | Taylor, Jr. | 342/96 |
| 3,603,994 A | 9/1971 | Williams et al. | 342/96 |
| 3,699,573 A | 10/1972 | Andrews et al. | 342/96 |
| 3,725,918 A | 4/1973 | Fleischer et al. | 343/5 EM |
| 3,869,601 A | 3/1975 | Metcalf | 392/450 |
| 3,971,018 A | 7/1976 | Isbister et al. | 343/5 CD |
| 4,623,966 A | 11/1986 | O'Sullivan | 364/461 |
| 5,051,751 A | 9/1991 | Gray | 342/107 |
| 5,138,321 A | 8/1992 | Hammer | 342/36 |
| 5,170,440 A | 12/1992 | Cox | 382/199 |
| 5,202,691 A | 4/1993 | Hicks | 342/90 |
| 5,307,289 A | 4/1994 | Harris | 364/400 |
| 5,314,037 A | 5/1994 | Shaw et al. | 180/169 |
| 5,343,206 A | 8/1994 | Ansaldi et al. | 342/70 |

(Continued)

OTHER PUBLICATIONS

Dickmanns, E.D.; Mysliwetz, B.D.; "Recursive 3-D Road and Relative Ego-State Recognitiion," *IEEE Transactions on Pattern Analysis and Machine Intelligence*, vol. 14, No. 2, Feb. 1992, pp 199-213.

(Continued)

*Primary Examiner*—Thomas H. Tarcza
*Assistant Examiner*—Isam Alsomiri
(74) *Attorney, Agent, or Firm*—Raggio & Dinnin, P.C.

(57) ABSTRACT

A first Kalman filter estimates true measures of yaw rate and vehicle speed from associated noisy measures thereof generated by respective sensors in a host vehicle, and a second Kalman filter estimates therefrom parameters of a clothoid model of road curvature. Measures of range, range rate, and azimuth angle from a target state estimation subsystem, e.g. a radar system, are processed by an extended Kalman filter to provide an unconstrained estimate of the state of a target vehicle. Associated road constrained target state estimates are generated for one or more roadway lanes, and are compared—either individually or in combination—with the unconstrained estimate. If a constrained target state estimate corresponds to the unconstrained estimate, then the state of the target vehicle is generated by fusing the unconstrained and constrained estimates; and otherwise is given by the unconstrained estimate alone.

22 Claims, 14 Drawing Sheets

U.S. PATENT DOCUMENTS

| | | | |
|---|---|---|---|
| 5,402,129 A | 3/1995 | Gellner et al. | 342/70 |
| 5,406,289 A | 4/1995 | Barker et al. | 342/96 |
| 5,471,214 A | 11/1995 | Faibish et al. | 342/70 |
| 5,530,651 A | 6/1996 | Uemura et al. | 364/461 |
| 5,537,119 A | 7/1996 | Poore, Jr. | 342/96 |
| 5,587,929 A | 12/1996 | League et al. | 342/159 |
| 5,594,414 A | 1/1997 | Namngani | 340/436 |
| 5,598,164 A | 1/1997 | Reppas et al. | |
| 5,627,768 A | 5/1997 | Uhlmann et al. | |
| 5,631,639 A | 5/1997 | Hibino et al. | |
| 5,633,642 A | 5/1997 | Hoss et al. | |
| 5,657,251 A | 8/1997 | Fiala | |
| 5,668,739 A | 9/1997 | League et al. | |
| 5,684,473 A | 11/1997 | Hibino et al. | |
| 5,689,264 A | 11/1997 | Ishikawa et al. | |
| 5,703,593 A | 12/1997 | Campbell et al. | |
| 5,710,565 A * | 1/1998 | Shirai et al. | 342/70 |
| 5,751,211 A * | 5/1998 | Shirai et al. | 340/435 |
| 5,926,126 A * | 7/1999 | Engelman | 342/70 |
| 5,948,043 A | 9/1999 | Mathis | |
| 5,955,967 A * | 9/1999 | Yamada | 340/904 |
| 5,959,552 A | 9/1999 | Cho | 340/903 |
| 5,959,574 A | 9/1999 | Poore, Jr. | 342/96 |
| 5,983,161 A | 11/1999 | Lemelson et al. | 701/301 |
| 6,070,121 A | 5/2000 | Matsuda | 701/205 |
| 6,085,151 A | 7/2000 | Farmer et al. | 342/70 |
| 6,134,509 A | 10/2000 | Furusho et al. | 702/167 |
| 6,161,071 A | 12/2000 | Shuman et al. | 701/48 |
| 6,198,426 B1 | 3/2001 | Tamatsu et al. | 342/70 |
| 6,226,389 B1 | 5/2001 | Lemelson et al. | 382/104 |
| 6,265,991 B1* | 7/2001 | Nishiwaki et al. | 340/903 |
| 6,275,231 B1 | 8/2001 | Obradovich | 345/349 |
| 6,275,773 B1 | 8/2001 | Lemelson et al. | 701/301 |
| 6,282,478 B1* | 8/2001 | Akita | 701/70 |
| 6,292,752 B1* | 9/2001 | Franke et al. | 701/300 |
| 6,300,865 B1* | 10/2001 | Fechner et al. | 340/436 |
| 6,343,253 B1 | 1/2002 | Matsuura et al. | 701/200 |
| 6,370,475 B1 | 4/2002 | Breed et al. | 701/301 |
| 6,393,376 B1* | 5/2002 | Andreas | 702/157 |
| 6,405,132 B1 | 6/2002 | Breed et al. | 701/301 |
| 6,420,997 B1 | 7/2002 | Cong | 342/70 |
| 6,470,272 B2 | 10/2002 | Cong et al. | 701/301 |
| 6,643,588 B1* | 11/2003 | Ibrahim | 701/301 |
| 6,675,094 B2* | 1/2004 | Russell et al. | 701/301 |
| 2002/0022927 A1 | 2/2002 | Lemelson et al. | 701/301 |
| 2002/0044080 A1* | 4/2002 | Shirai et al. | 342/70 |
| 2002/0049539 A1 | 4/2002 | Russell et al. | 701/301 |
| 2003/0218563 A1* | 11/2003 | Miyahara | 342/70 |

OTHER PUBLICATIONS

Hsu, J.C.; Chen, W. L.; Lin, R. H; Yeh, E. C.; "Estimations of previewed road curvatures and vehicular motion by a vision-based data fusion scheme," *Machine Vision and Applications*, vol. 9, 1997, p. 179-192.

Barber, P.A.; King, P.; Richardson, M.; "Road lane trajectory estimation using yaw rate gyroscopes for intelligent vehicle control," *Transactions on the Institute of Measurement and Control*, vol. 20, No. 2, 1998, pp. 59-66.

Schiffmann, J.K.; Widmann, G.R.; "Model-Based Scene Tracking Using Radar Sensors for Intelligent Automotive Vehicle Systems," IEEE International Radar Conference, 1998, pp. 421-426.

Jilkov, V.P.; Angelova, D.S.; Semerdjiev, Tz.A.; "Design and Comparison of Mode-Set Adaptive IMM Algorithms for Maneuvering Target Tracking," *IEEE Transactions on Aerospace and Electronic Systems*, vol. 35, No. 1, Jan. 1999, pp. 343-350.

Tsang, S.H.; Hoare, E.G; Hall, P. S.; Clarke, N. J.; "Automotive Radar Image Processing To Predict Vehicle Trajectory," IEEE International Radar Conference, 1999, p. 867-870.

Jula, H.; Kosmatopoulos, E.; Ioannou, P.; "Collision Avoidance Analysis for Lane Changing and Merging," Technical Report, University of Southern California, 1999.

Lin, C-F.; Ulsoy, A.G.; LeBlanc, D.J.; "Vehicle Dynamics and External Disturbance Estimation for Vehicle Path Prediction," *IEEE Transactions on Control Systems Technology*, vol. 8, No. 3, May, 2000, pp 508-518.

Ke, C-C.; Herrero, J.G.; Llinas, J.; "Comparative Analysis of Alternative Ground Target Tracking Techniques," in *International Conference on Information Fusion*, vol. 2, 2000, pp. WeB5:3-10.

Miyahara, S.; "A Method for Radar-Based Target Tracking in Non-Uniform Road Condition," SAE 2003 World Congress, 2003-01-0013, 2003.

Karlsson, R.; Jansson, J.; Gustafsson, F.; "Model-based statistical tracking and decision making for collision avoidance application," Technical Report, Linkoping University, LiTH-ISY-R-2492, Feb. 2003.

Coue, C.; Fraichard, Th.; Bessiere, P.; Mazer, E.; "Using Bayesian Programming for Multi-Sensor Multi-Target Tracking in Automotive Applications," *Proceediings of the IEEE Int. Conf. on Robotics and Automation*, Taipei, Taiwan, May 2003.

E. D. Dickmanns, A. Zapp. A curvature-based scheme for improving road vehicle guidance by computer vision. Mobile Robots. Cambridge, MA: SPIE, 1986; vol. 727, p. 161-168.

J. Goldbeck, B. Huertgen, S. Ernst, L. Kelch. Lane following combining vision and DGPS. Image and Vision Computing, vol. 18, 2000, p. 425-433.

S. Shen, A Multisensor-Based Automotive Collision Prediction System, Ph.D. Dissertation, Wright State University, Oct., 2002.

\* cited by examiner

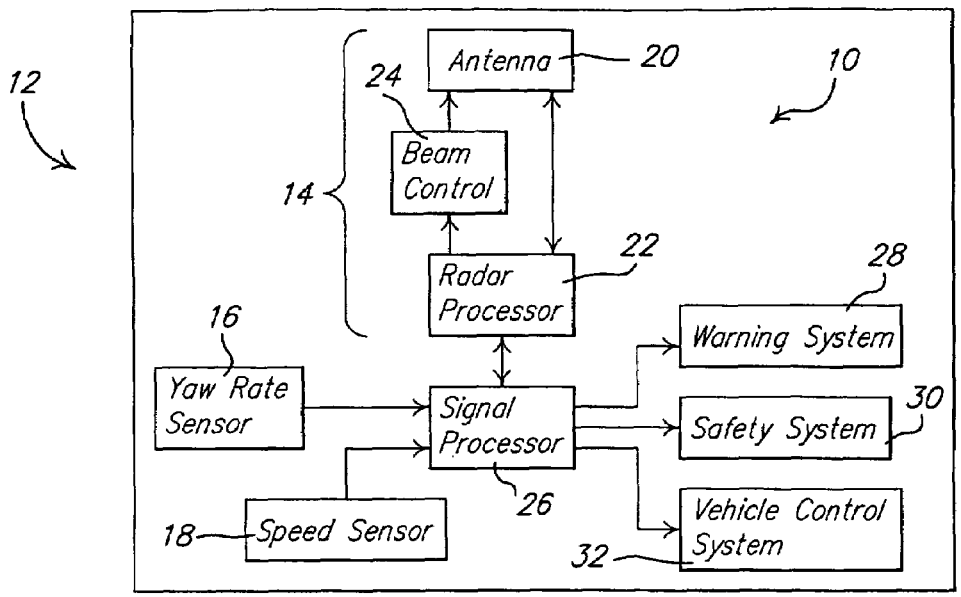
FIG. 1.
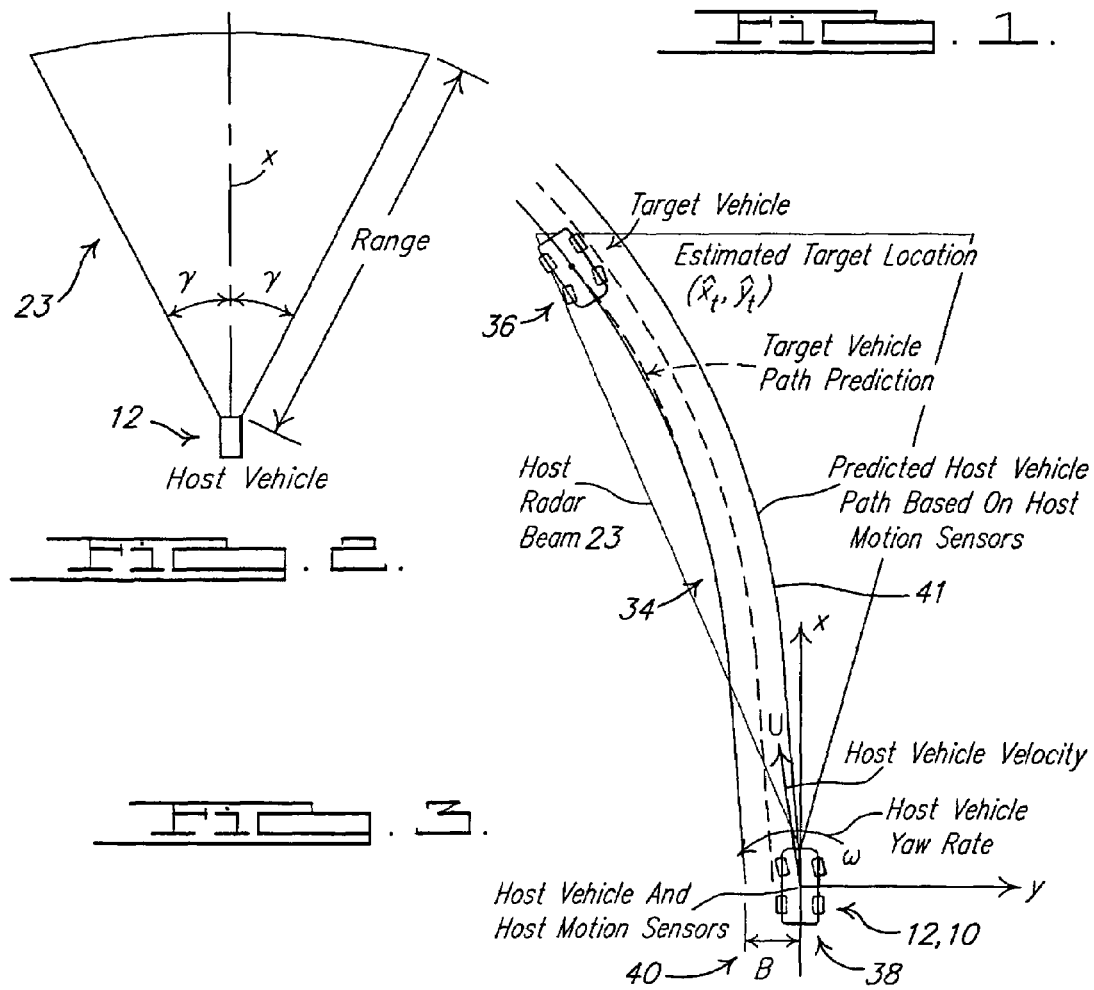
FIG. 2.
FIG. 3.

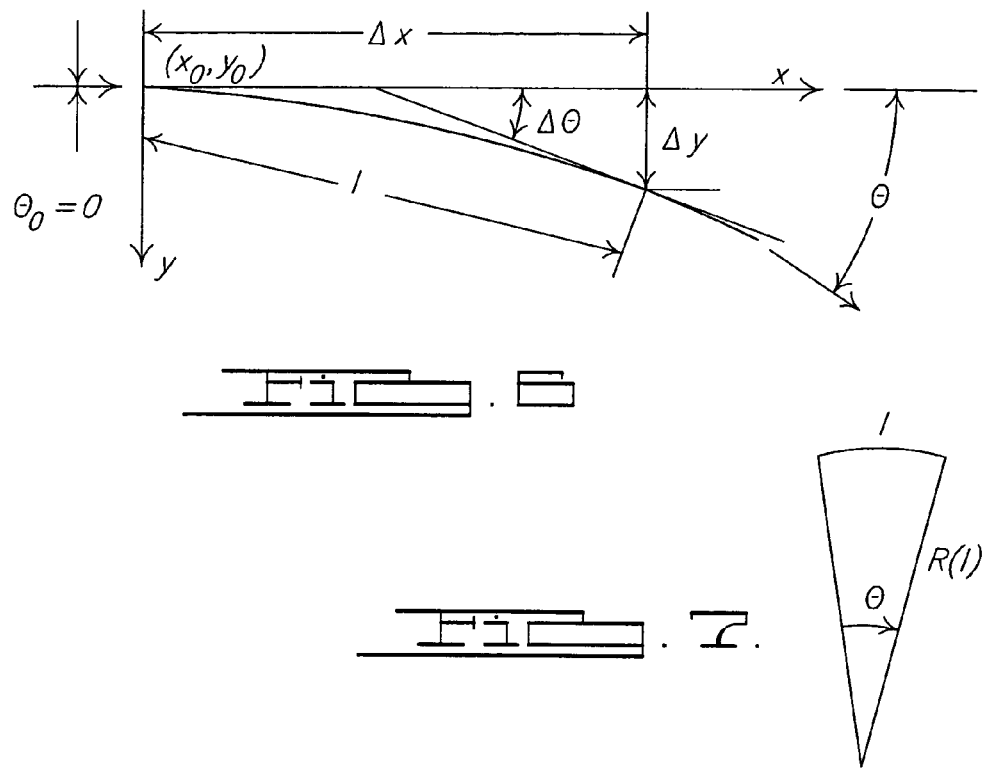
FIG. 6
FIG. 7
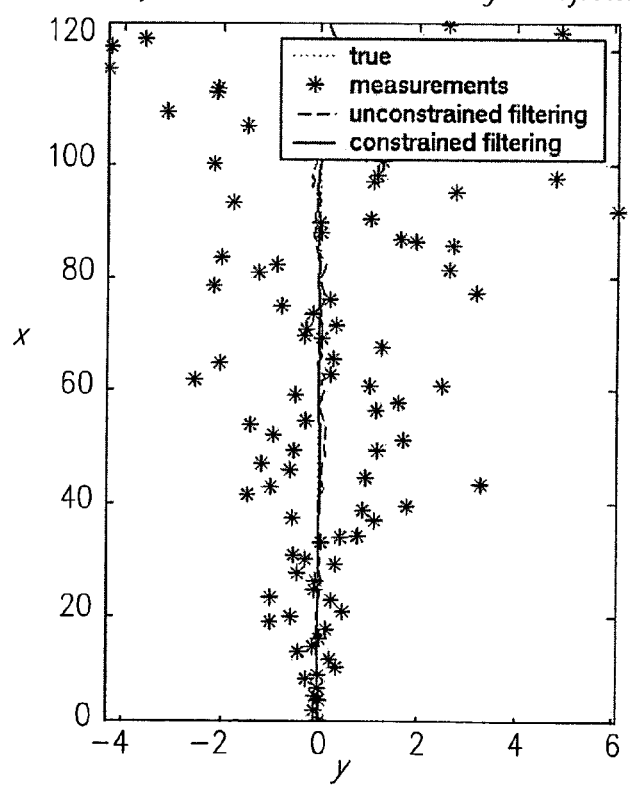
FIG. 8a.

ROAD CURVATURE ESTIMATION AND AUTOMOTIVE TARGET STATE ESTIMATION SYSTEM

CROSS-REFERENCE TO RELATED APPLICATIONS

The instant application claims the benefit of prior U.S. Provisional Application Ser. No. 60/396,211 filed on Jul. 15, 2002, which is incorporated herein by reference.

BRIEF DESCRIPTION OF THE DRAWINGS

In the accompanying drawings:

FIG. 1 illustrates a block diagram of hardware associated with a predictive collision sensing system;

FIG. 3 depicts a driving scenario for purposes of illustrating the operation of the predictive collision sensing system;

FIG. 4 illustrates a block diagram of the hardware and an associated signal processing algorithm of the predictive collision sensing system;

FIG. 6 illustrates a geometry used for determining curvature parameters of a roadway;

FIG. 7 illustrates the geometry of an arc;

FIGS. 8a–d illustrates an example of the estimation of target position, lateral velocity, and road curvature parameters for a straight roadway;

DESCRIPTION OF EMBODIMENT(S)

Figure 2:
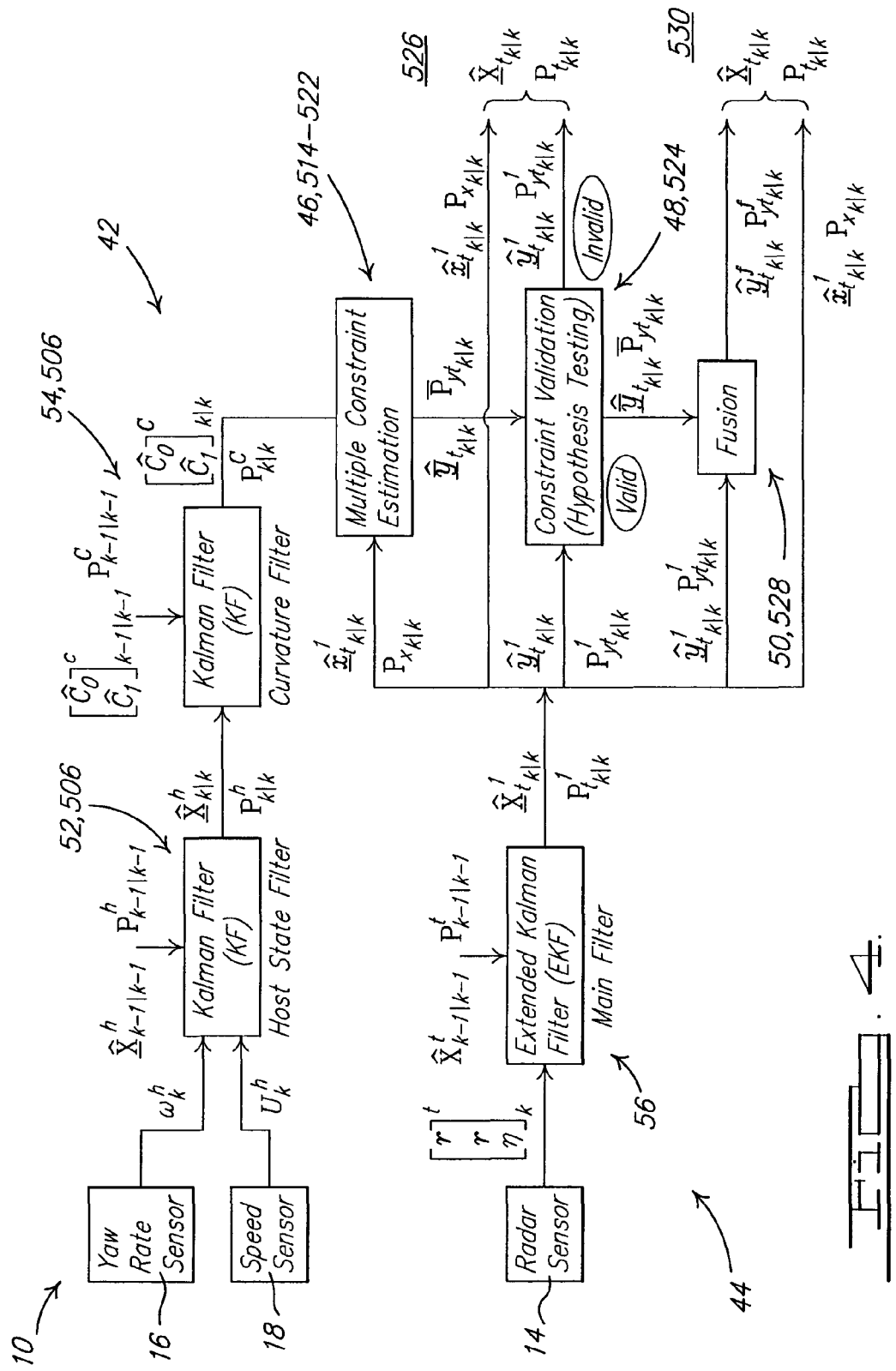
FIG. 2 illustrates a coverage pattern of a radar beam used by the predictive collision sensing system.

Referring to FIG. 1, a predictive collision sensing system 10 incorporated in a host vehicle 12, comprises a radar system 14 for sensing objects external to the host vehicle 12, and a set of sensors, including a yaw rate sensor 16, e.g. a gyroscopic sensor, and a speed sensor 18, for sensing motion of the host vehicle 12. The yaw rate sensor 16 and speed sensor 18 respectively provide measurements of the yaw rate and speed of the host vehicle 12. The radar system 14, e.g. a Doppler radar system, comprises an antenna 20 and a radar processor 22, wherein the radar processor 22 generates the RF signal which is transmitted by the antenna 20 and which is reflected by objects in view thereof. The radar processor 22 demodulates the associated reflected RF signal that is received by the antenna 20, and detects a signal that is responsive to one or more objects that are irradiated by the RF signal transmitted by the antenna 20. For example, the radar system 14 provides target range, range rate and azimuth angle measurements in host vehicle 12 fixed coordinates. Referring to FIG. 2, the antenna 20 is adapted to generate a radar beam 23 of RF energy that is, for example, either electronically or mechanically scanned across an azimuth range, e.g. +/−γ, e.g. +/−50 degrees, responsive to a beam control element 24, and which has a distance range, e.g. about 100 meters, from the host vehicle 12 that is sufficiently far to enable a target to be detected sufficiently far in advance of a prospective collision with the host vehicle 12 so as to enable a potentially mitigating action to be taken by the host vehicle 12 so as to either avoid the prospective collision or mitigate damage or injury as a result thereof. The radar processor 22, yaw rate sensor 16, and speed sensor 18 are operatively connected to a signal processor 26 that operates in accordance with an associated predictive collision sensing algorithm to determine whether or not a collision with an object, e.g. a target vehicle 36 (illustrated in FIG. 3), is likely, and if so, to also determine an action to be taken responsive thereto, for example, one or more of activating an associated warning system 28 or safety system 30 (e.g. frontal air bag system), or using a vehicle control system 32 (e.g. an associated braking or steering system) to take evasive action so as to either avoid the prospective collision or to reduce the consequences thereof.

Referring to FIG. 3, the host vehicle 12 is shown moving along a multiple lane roadway 34, either straight or curved, and there is also shown a target vehicle 36 moving in an opposite direction, towards the host vehicle 12. Generally, there can be any number of target vehicles 36 that can fit on the roadway 34, each moving in the same or opposite direction as the host vehicle 12. These target vehicles 36 can either be in the host lane 38 or in a neighboring lane 40 either adjacent to or separated from the host lane 38, but generally parallel thereto. For purposes of analysis, it is assumed that the host vehicle 12 moves along the center line 41 of its lane 38 steadily without in-lane wandering, and the road curvatures of all the parallel lanes 38, 40 are the same. Road curvature is assumed small such that the differences between the heading angles of the host vehicle 12 and any detectable target vehicles 36 are smaller than 15 degrees.

Referring to FIG. 4, the predictive collision sensing system 10 uses the measurements of speed $U^h$ and yaw rate $\omega^h$ of the host vehicle 12 from the speed sensor 18 and the yaw rate sensor 16 respectively therein; and the measurements of target range r, range rate ṙ and azimuth angle η for all target vehicles 36 from the radar system 14 mounted on the host vehicle 12; along with the corresponding error covariance matrices of all these measurements, to estimate each target's two dimensional position, velocity and acceleration [x, x, x, y, y, y]' in the host fixed coordinate system at every sampling instance, preferably with an error as small as possible. The predictive collision sensing system 10 comprises 1) a road curvature estimation subsystem 42 for estimating the curvature of the roadway 34 using measurements from the host vehicle motion sensors, i.e. the yaw rate sensor 16 and speed sensor 18; 2) an unconstrained target state estimation subsystem 44 for estimating the state of a target illuminated by the radar beam 23 and detected by the radar processor 22; 3) a constrained target state estimation subsystem 46 for estimating the state of the constraint on the target, assuming that the target is constrained to be on the roadway 34, either in the host lane 38 or in a neighboring lane 40, for each possible lane 38, 40; 4) a target state decision subsystem 48 for determining whether the best estimate of the target state is either the unconstrained target state, or a target state constrained by one of the constraints; and 5) a target state fusion subsystem 50 for fusing the unconstrained target state estimate with the appropriate constraint identified by the target state decision subsystem 48 so as to generate a fused target state. The best estimate of target state—either the unconstrained target state or the fused target state—is then used by a decision or control subsystem for determining whether or not the host vehicle 12 is at risk of collision with the target, and if so, for determining and effecting what the best course of action is to mitigate the consequences thereof, e.g. by action of either the warning system 28, the safety system 30, or the vehicle control system 32, or some combination thereof. When possible, the use of the geometric structure of the roadway 34 as a constraint to the target kinematics provides for a more accurate estimate of the target state, which thereby improves the reliability of any actions taken responsive thereto.

Figure 5:
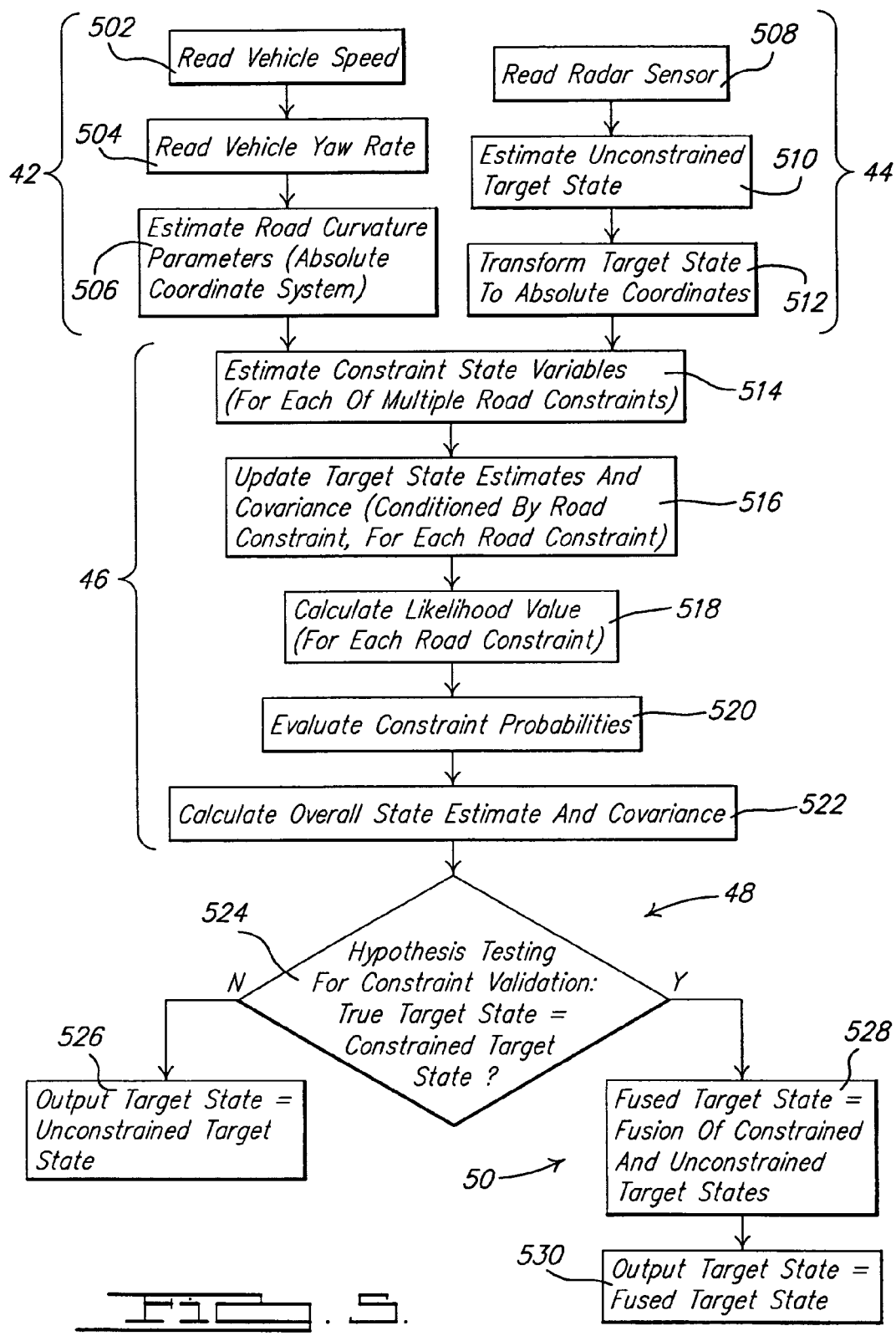
FIG. 5 illustrates a flow chart of an associated signal processing algorithm of the predictive collision sensing system.
Figure 5B:
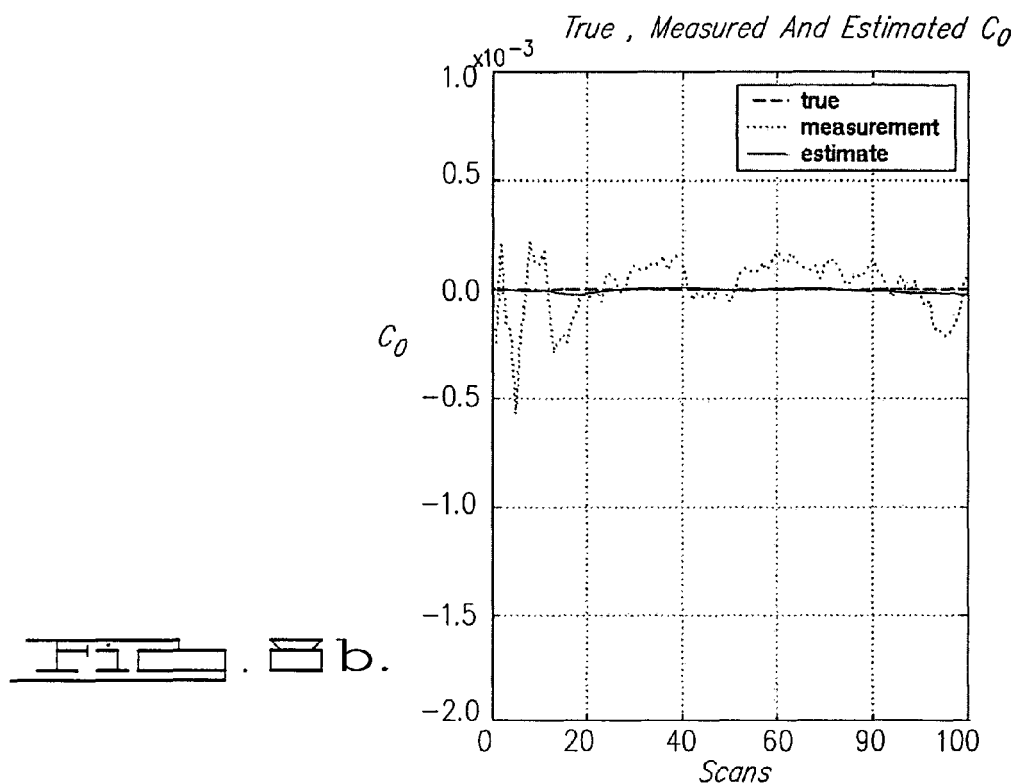
Figure 5C:
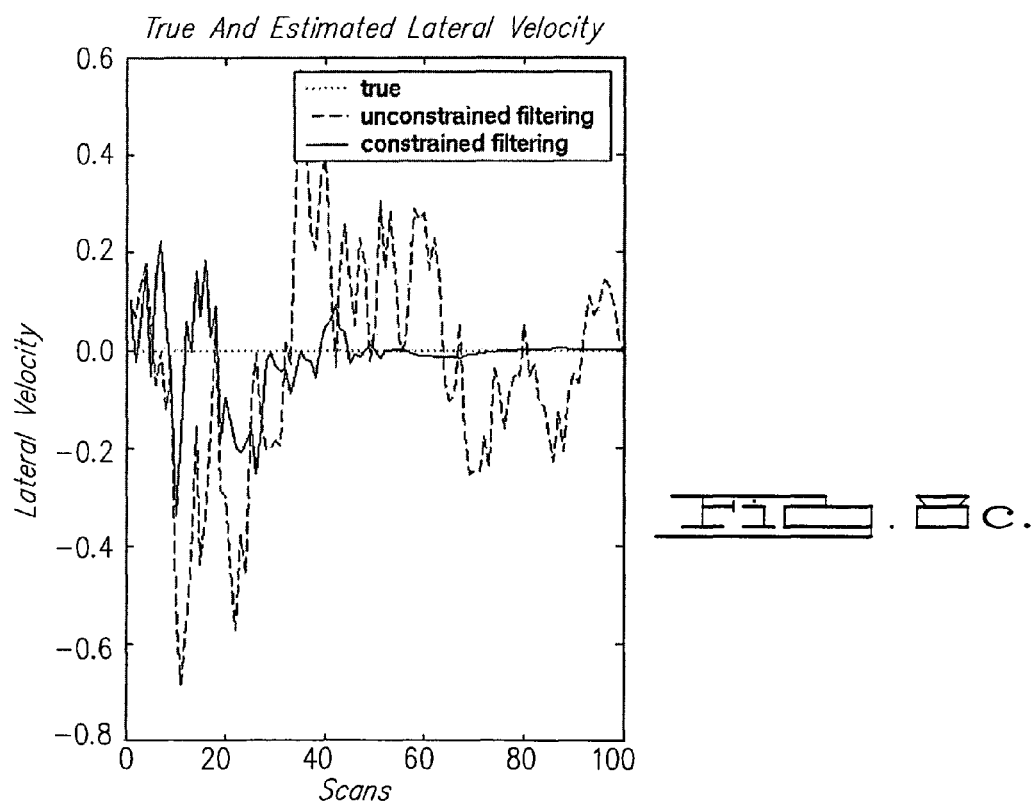
Figure 8D:
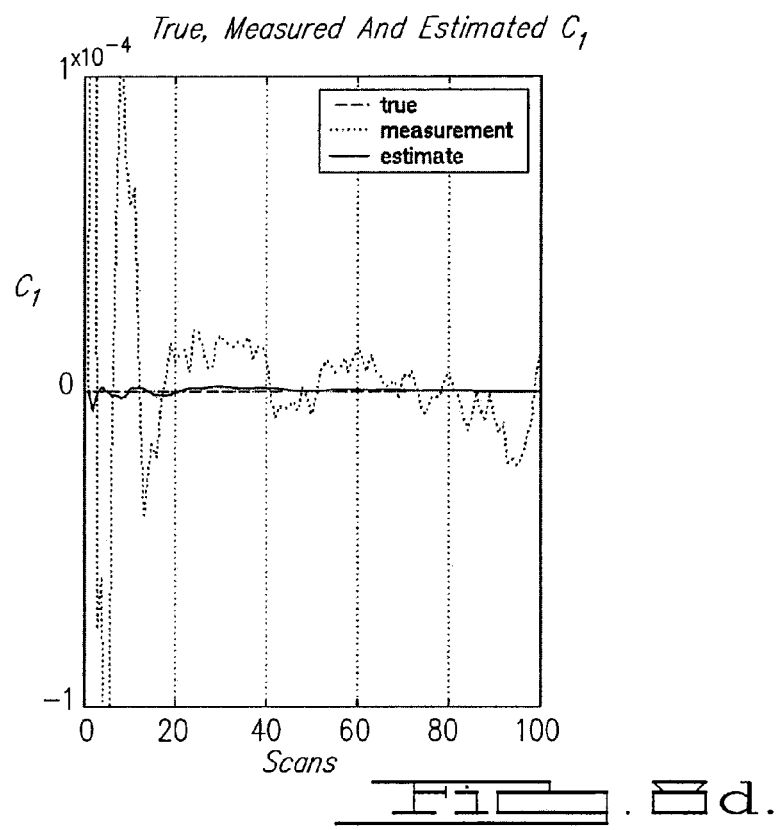

Referring also to FIG. 5, illustrating a method 500 of detecting the state, i.e. kinematic state variables, of a target in view of the host vehicle 12, the steps of which are, for example, carried out by the signal processor 26, in steps (502) and (504), the speed Uh and yaw rate $\omega^h$ of the host vehicle 12 relative to the roadway 34 are respectively read from the speed sensor 18 and the yaw rate sensor 16 respectively. Then, in step (506), the curvature parameters and associated covariance thereof of the roadway 34 are estimated using first 52 and second 54 Kalman filters that respectively estimate the state (i.e. kinematic state variables of the host vehicle 12) and associated covariance thereof of the host vehicle 12, and then the curvature parameters and associated covariance thereof of the roadway 34, as described hereinbelow, wherein the curvature parameters and associated covariance thereof of the roadway 34 are then subsequently used by the constrained target state estimation subsystem 46 to generate associated constraints on the possible location of a prospective target vehicle 36.

A well-designed and constructed roadway 34 can be described by a set of parameters, including curvature, wherein the curvature of a segment of the roadway 34 is defined as:

$$C = \frac{1}{R} \quad (1)$$

where R is the radius of the segment. In general, for a piece of smooth roadway 34, the curvature variation can be described as a function of a distance l along the roadway 34 by a so-called clothoid model, i.e.:

$$C = C_0 + \frac{dC}{dl}l = C_0 + C_1 l \quad (2)$$

where $C_1 = 1/A^2$ and A is referred to as the clothoid parameter.

Referring to FIG. 6, the heading angle $\theta$ defining the heading direction is given by:

$$\theta = \theta_0 + \int_0^l C(\tau)d\tau. \quad (3)$$

Substituting equation (2) into equation (3) gives $$\Delta\theta = \theta - \theta_0 = C_0 l + C_1 l^2/2 \quad (4)$$

Referring to FIG. 6, the equation of the roadway 34, i.e. the road equation, in x-y coordinates is given by:

$$x = x_0 + \int_0^l \cos\theta(\tau) d\tau \text{ and} \quad (5)$$

$$y = y_0 + \int_0^l \sin\theta(\tau) d\tau. \quad (6)$$

Assuming the heading angle $\theta$ to be within 15 degrees, i.e. $|\theta|<15°$, equations (5) and (6) can be approximated by:

$$\Delta x = x - x_0 \approx l \quad (7)$$

$$\Delta y = y - y_0 \approx C_0 l^2/2 + C_1 l^3/6 \approx C_0 \frac{\Delta x^2}{2} + C_1 \frac{\Delta x^3}{6} \quad (8)$$

Accordingly, the roadway 34 is modeled by an incremental road equation in terms of curvature coefficients: $C_0$ and $C_1$. This incremental road equation describes a broad range of road shapes as follows: 1) Straight roadway 34: $C_0=0$ and $C_1=0$; 2) circular roadway 34: $C_1=0$; and 3) a general roadway 34 with an arbitrary shape for which the change in heading angle $\theta$ is less than 15 degrees: $C_0>0$.

The road curvature parameters $C_0$ and $C_1$ are estimated using data from motion sensors (yaw rate sensor 16 and speed sensor 18) in the host vehicle 12, based upon the assumption that the host vehicle 12 moves along the center line 41 of the roadway 34 or associated host lane 38.

The road curvature parameters $C_0$ and $C_1$ can be calculated from data of $\omega$, $\dot\omega$, U, $\dot U$ responsive to measurements of yaw rate $\omega^h$ and speed $U^h$ of the host vehicle 12 from the available host vehicle 12 motion sensors. However, generally the measurements of yaw rate $\omega^h$ and speed $U^h$, from the yaw rate sensor 16 and speed sensor 18 respectively, are noisy. A host state filter implemented by a first Kalman filter 52 is beneficial to generate estimates of $\omega$, $\dot\omega$, U, $\dot U$ from the associated noisy measurements of yaw rate $\omega^h$ and speed $U^h$; after which a curvature filter implemented by a second Kalman filter 54 is used to generate smoothed estimates of the curvature parameters $C_0$ and $C_1$. The dynamics of the host vehicle 12 for the host state filter follows a predefined set of kinematic equations (constant velocity in this case) given by:

$$\underline{x}_{k+1}^h = F_k^h \cdot \underline{x}_k^h + \underline{w}_k^h, \underline{w}_k^h \sim N(0, Q_k^h) \quad (9)$$

$$\underline{z}_k^h = H_k^h \cdot \underline{x}_k^h + \underline{v}_k^h, \underline{v}_k^h \sim N(0, R_k^h) \quad (10)$$

where $$F_k^h = \begin{bmatrix} 0 & T & 0 & 0 \\ 0 & 1 & 0 & 0 \\ 0 & 0 & 1 & T \\ 0 & 0 & 0 & 1 \end{bmatrix}, H_k^h = \begin{bmatrix} 1 & 0 & 0 & 0 \\ 0 & 0 & 1 & 0 \end{bmatrix}, \quad (11)$$

-continued $$x_k^h = \begin{bmatrix} U \\ \dot{U} \\ \omega \\ \dot{\omega} \end{bmatrix}_k \text{ and } z_k^h = \begin{bmatrix} U^h \\ \omega^h \end{bmatrix}_k$$

and where T is the sampling period, superscript $(.)^h$ is used to indicate that the filter is the host filter, and $U^h$ and $\omega^h$ are host vehicle 12 speed and yaw rate measurements. The first Kalman filter 52 is implemented to estimate the host state $\hat{x}^{k|k^h}$ and its error covariance $P_{k|k}^h$, as illustrated in FIG. 4.

The estimate of the host state from the first Kalman filter 52, i.e. the host state filter, is then used to generate a synthetic measurement that is input to the second Kalman filter 54, i.e. curvature coefficient filter, wherein the associated Kalman filters 52, 54 operate in accordance with the Kalman filtering process described more fully in the Appendix hereinbelow. The relationship between the road curvature parameters $C_0$, $C_1$ and the host state variables $\omega$, $\dot{\omega}$, $U$, $\dot{U}$ is derived as follows:

From equation (4), the radius R of road curvature is expressed generally as a function R(l) of the distance l along the roadway, as is illustrated in FIG. 7. Taking the time derivative on both sides of equation (4) yields:

$$\theta = C_0 l + C_1 \cdot l \cdot l = (C_0 + C_1 \cdot l) \cdot l. \quad (12)$$

Noting that $\dot{\theta} = \omega$, the yaw rate of the host vehicle 12, and that $\dot{l} = U$, the speed of the host vehicle 12, and substituting the clothoid model of equation (2) in equation (12), yields:

$$\omega = C \cdot U \quad (13)$$

or $$C = \frac{\omega}{U}. \quad (14)$$

Clothoid parameter $C_0$ is given as the value of curvature C at l=0, or $$C_0 = C|_{l=0} = \frac{\omega}{U}. \quad (15)$$

Taking the derivative on both sides of equation (14) yields $$\dot{C} = \frac{\dot{\omega}}{U} - \frac{\omega \cdot \dot{U}}{U^2}. \quad (16)$$

Using the definition of $C_1$, from equation (2), $C_1$ may be expressed in terms of the host state as follows:

$$C_1 = \frac{dC}{dl} = \frac{dC}{dt} \cdot \frac{dt}{dl} = \frac{\dot{C}}{U} = \frac{\dot{\omega}}{U^2} - \frac{\omega \cdot \dot{U}}{U^3}. \quad (17)$$

The system equations for the second Kalman filter 54, i.e. the curvature filter, that generates curvature estimates $\hat{C}_{0_{k|k}}$ and $\hat{C}_{1_{k|k}}$ are given by $$x_{k+1}^C = F_k^C \cdot x_k^C + w_k^C, \quad w_k^C \sim N(0, Q_k^C) \quad (18)$$

$$z_k^C = H^C \cdot x_k^C + v_k^C, \quad v_k^C \sim N(0, R_k^C) \quad (19)$$

where $$F_k^C = \begin{bmatrix} 1 & \Delta t \cdot \hat{U} \\ 0 & 1 \end{bmatrix}, H_k^h = \begin{bmatrix} 1 & 0 \\ 0 & 1 \end{bmatrix}, x_k^C = \begin{bmatrix} C_0 \\ C_1 \end{bmatrix}_k, \quad (19a)$$

$\Delta t$ is the update time period of the second Kalman filter 54, and the values of the elements of the measurement vector $z_k^C$ are given by the corresponding values of the state variables—i.e. the clothoid parameters $C_0$ and $C_1$—of the curvature filter.

The measurement, $z_k^C$, is transformed from the estimated state $[\hat{U}, \hat{\dot{U}}, \hat{\omega}, \hat{\dot{\omega}}]_{k|k}^T$ as follows:

$$z_k^C = \begin{bmatrix} \dfrac{\hat{\omega}}{\hat{U}} \\ \dfrac{\hat{\dot{\omega}}}{\hat{U}^2} - \dfrac{\hat{\omega} \cdot \hat{\dot{U}}}{\hat{U}^3} \end{bmatrix}_{k|k} \quad (20)$$

and the associated covariance of the measurements is given by:

$$R_k^C = J_k^C P_{k|k}^h (J_k^C)^T \quad (21)$$

where $$J_k^C = \quad (22)$$

$$\dfrac{\partial \begin{bmatrix} C_0 \\ C_1 \end{bmatrix}}{\partial x^h}\bigg|_{x^h = \hat{x}_{k|k}^h} = \begin{bmatrix} -\dfrac{\hat{\omega}}{\hat{U}^2} & 0 & \dfrac{1}{\hat{U}} & 0 \\ -\dfrac{2 \cdot \hat{\dot{\omega}}}{\hat{U}^3} + \dfrac{3 \cdot \hat{\omega} \cdot \hat{\dot{U}}}{\hat{U}^4} & -\dfrac{\hat{\omega}}{\hat{U}^3} & -\dfrac{\hat{\dot{U}}}{\hat{U}^3} & \dfrac{1}{\hat{U}^2} \end{bmatrix}_{k|k}.$$

It should be understood that other systems and methods for estimating the curvature parameters of the roadway 34 may be substituted in the road curvature estimation subsystem 42 for that described above. For example, the curvature parameters of the roadway may also be estimated from images of the roadway 34 by a vision system, either instead of or in conjunction with the above described system based upon measurements of speed $U^h$ and yaw rate $\omega^h$ from associated motion sensors. Furthermore, it should be understood that yaw rate can be either measured or determined in a variety of ways, or using a variety of means, for example, but not limited to, using a yaw gyro sensor, a steering angle sensor, a differential wheel speed sensor, or a GPS-based sensor; a combination thereof; or functions of measurements therefrom (e.g. a function of, inter alia, steering angle rate).

Referring again to FIG. 5, in step (508), the measurements of target range r, range rate $\dot{r}$, and azimuth angle $\eta$ are read from the radar processor 22, and are used as inputs to an extended Kalman filter 56, i.e. the main filter, which, in step (510), generates estimates of the unconstrained target state—i.e. the kinematic state variables of the target—which estimates are relative values in the local coordinate system of the host vehicle 12 (i.e. the host-fixed coordinate system) which moves with therewith. In step (512), the unconstrained target state, i.e. the target velocity and acceleration, is transformed to absolute coordinates of the absolute coordinate system fixed on the host vehicle 12 at the current instant of time as illustrated in FIG. 3, so as to be consistent with the absolute coordinate system in which the road constraint equations are derived and for which the associated curvature parameters are assumed to be constant, when used in the associated constraint equations described hereinbelow in order to generate estimates of the constrained target state. The absolute coordinate system superimposes the moving coordinate system in space at the current instant, so that the transformation in step (512) is realized by adding the velocities and accelerations of the host vehicle 12 to the corresponding target estimates, in both x and y directions.

The result from the coordinate transformation in step (512) of the output from the extended Kalman filter 56 is then partitioned into the following parts, corresponding respectively to the x and y position of the target vehicle 36 relative to the host vehicle 12, wherein the superscript 1 refers to the unconstrained target state of the target vehicle 36:

$$\hat{X}^1_{t_{k|k}} = \begin{bmatrix} \hat{x}^1_t \\ \hat{y}^1_t \end{bmatrix}_{k|k} \text{ and } P^1_{t_{k|k}} = \begin{bmatrix} P^1_{x_t} & P^1_{xy_t} \\ P^1_{yx_t} & P^1_{y_t} \end{bmatrix}_{k|k}. \quad (23)$$

Referring again to FIG. 5, following steps (506) and (512), in steps (514) through (524) described more fully hereinbelow, various constraints on the possible trajectory of the target vehicle 36 are applied and tested to determine if the target vehicle 36 is likely traveling in accordance with one of the possible constraints. For example, the constraints are assumed to be from a set of lanes that includes the host lane 38 and possible neighboring lanes 40, and a target vehicle 36 that is likely traveling in accordance with one of the possible constraints would likely be traveling on either the host lane 38 or one of the possible neighboring lanes 40. In step (524), the hypothesis that the target vehicle 36 is traveling on either the host lane 38 or one of the possible neighboring lanes 40 is tested for each possible lane. If the hypothesis is not satisfied for one of the possible lanes, then, in step (526), the state of the target is assumed to be the unconstrained target state, which is then used for subsequent predictive crash sensing analysis and control responsive thereto. Otherwise, from step (524), in step (528), the target state is calculated by the target state fusion subsystem 50 as the fusion of the unconstrained target state with the associated state of the constraint that was identified in step (524) as being most likely.

Prior to discussing the process of steps (514) through (524) for determining whether the target is likely constrained by a constraint, and if so, what is the most likely constraint, the process of fusing the unconstrained target state with state of a constraint will first be described for the case of a target vehicle 36 moving in the same lane as the host vehicle 12. The constraints are assumed to be active in y-direction only, consistent with the assumptions that the host vehicle 12 moves along the center line 41 of its lane 38 steadily without in-lane wandering and that the road curvatures of all the parallel lanes 38, 40 are the same, and given that the absolute coordinate system is fixed on the host vehicle 12 at the current instant of time. Assuming the target vehicle 36 is moving in the same lane 38 as the host vehicle 12, and using the road constraint equation with the estimated coefficients, in step (514), the constraint state variables are then given in terms of the lateral kinematic variable as:

$$\underline{\bar{y}}^1_{t_{k|k}} = \begin{bmatrix} \bar{y} \\ \bar{\dot{y}} \\ \bar{\ddot{y}} \end{bmatrix}_{t_{k|k}} = \begin{bmatrix} \hat{C}_0(\hat{x}^1)^2/2 + \hat{C}_1(\hat{x}^1)^3/6 \\ \hat{C}_0\hat{x}^1\hat{\dot{x}}^1 + \hat{C}_1(\hat{x}^1)^2\hat{\dot{x}}^1/2 \\ \hat{C}_0(\hat{\dot{x}}^1)^2 + \hat{C}_0\hat{x}^1\hat{\ddot{x}}^1 + \hat{C}_1\hat{x}^1(\hat{\dot{x}}^1)^2 + \hat{C}_1(\hat{x}^1)^2\hat{\ddot{x}}^1/2 \end{bmatrix} \quad (24)$$

and $$\bar{P}_{y t_{k|k}} A_k^1 P_{x t_{k|k}} (A_k^1)^T + A_k^2 P_{k|k}^C (A_k^2)^T \quad (25)$$

where $$A_k^1 = \begin{bmatrix} \hat{C}_0\hat{x}^1 + \hat{C}_1(\hat{x}^1)^2/2 & 0 & 0 \\ \hat{C}_0\hat{\dot{x}}^1 + \hat{C}_1\hat{x}^1\hat{\dot{x}}^1 & \hat{C}_0\hat{x}^1 + \hat{C}_1(\hat{x}^1)^2/2 & 0 \\ \hat{C}_0\hat{\ddot{x}}^1 + \hat{C}_1(\hat{\dot{x}}^1)^2 + \hat{C}_1\hat{x}^1\hat{\ddot{x}}^1 & 2\hat{C}_0\hat{\dot{x}} + 2\hat{C}_1\hat{x}^1\hat{\dot{x}} & \hat{C}_0\hat{x}^1 + \hat{C}_1(\hat{x}^1)^2/2 \end{bmatrix} \quad (26)$$

and $$A_k^2 = \begin{bmatrix} (\hat{x}^1)^2/2 & (\hat{x}^1)^3/6 \\ \hat{x}^1 \cdot \hat{\dot{x}}^1 & (\hat{x}^1)^2 \cdot \hat{\dot{x}}^1/2 \\ (\hat{\dot{x}}^1)^2 + \hat{x}^1 \cdot \hat{\ddot{x}}^1 & \hat{x}^1 \cdot (\hat{\dot{x}}^1)^2 + (\hat{x}^1)^2 \cdot \hat{\ddot{x}}^1/2 \end{bmatrix}. \quad (27)$$

In step (528), the two y-coordinate estimates, one from the main filter and the other from the road constraint, are then fused as follows:

$$P_{y t_{k|k}}^f = [(\bar{P}_{y t_{k|k}})^{-1} + (P_{y t_{k|k}}^1)^{-1}]^{-1} \quad (28)$$

$$\hat{\underline{y}}_{t_{k|k}}^f = P_{y t_{k|k}}^f [(\bar{P}_{y t_{k|k}})^{-1} \bar{\hat{y}}_{t_{k|k}} + (P_{y t_{k|k}}^1)^{-1} \hat{\underline{y}}_{t_{k|k}}^1] \quad (29)$$

Finally, the composed estimate of the target state is $$\hat{X}_{t_{k|k}} = \begin{bmatrix} \hat{x}_{t_{k|k}} \\ \hat{y}_{t_{k|k}}^f \end{bmatrix} \quad (30)$$

and

-continued $$P_{t_k|k} = \begin{bmatrix} P_{x_t} & \bar{P}_{xy_t} \\ \bar{P}'_{xy_t} & P^f_{y_t} \end{bmatrix}_{k|k}. \quad (31)$$

where $$\bar{P}_{xy_t} = P_{x_t}(A_k^l)' \quad (32)$$

In step (530), this composed estimate would then be output as the estimate of the target state if the target vehicle 36 were to be determined from steps (514) through (524) to be traveling in the host lane 38.

Returning to the process of steps (514) through (524) for determining whether the target is likely constrained by a constraint, and if so, what is the most likely constraint; according to the assumption that targets follow the same roadway 34, if the target vehicle 36 were known to travel in a particular lane, it would desirable to use estimated road parameters for that lane as a constraint in the main filter of estimating target kinematics. However, the knowledge of which lane the target vehicle 36 is current in is generally not available, especially when the target is moving on a curved roadway 34. Since the road equation (8) is only for the host lane 38 in the host-centered coordinate system, constrained filtering would require knowing which lane the target is in, and different constraint equations would be needed for different lanes. Ignoring the difference of road curvature parameters among these parallel lanes, i.e. assuming the curvature of each lane to be the same, the road equation for an arbitrary lane can be written as:

$$y = mB + \hat{C}_0 \frac{x^2}{2} + \hat{C}_1 \frac{x^3}{6}, m = 0, \pm 1, \pm 2, \ldots \quad (33)$$

where B is the width of the lanes and m represents the lane to be described (m=0 corresponds the host lane 38, m=1 corresponds the right neighboring lane 40, m=−1 corresponds the left neighboring lane 40, and so on). Without the prior knowledge of the target lane position, each of the multiple constraints forming a multiple constraint system (analogous to the so-called multiple model system) is tested to determine identify which, if any, of the constraints are active. A multiple constraint (MC) system is subjected to one of a finite number $N^C$ of constraints. Only one constraint can be in effect at any given time. Such systems are referred to as hybrid—they have both continuous (noise) state variables as well as discrete number of constraints.

The following definitions and modeling assumptions are made to facilitate the solution of this problem:

Constraint equations:

$$\underline{y}_{t_k} = \underline{f}_{t_k}(x_{t_k}) \quad (34)$$

where $\underline{f}_{t_k}$ denotes the constraint at time tk in effect during the sampling period ending tk at $t_k$.

Constraint: among the possible NC constraints $$\underline{f}_{t_k} \in \{\underline{f}^j\}_{j=1}^{N^C} \quad (35)$$

-continued $\hat{\underline{y}}^j_{t_k|k}$: state estimate at time $t_k$ using constraint $\underline{f}^j_{t_k}$ $\bar{P}_{yt_{kk}}{}^j, \bar{P}_{xyt_{kk}}{}^j$: covariance matrix at time $t_k$ under constraint $\underline{f}^j_{t_k}$ $\mu_{t_{k-1}}^j$ probability that the target is following constraint j at time $t_{k-1}$ Constraint jump process: is a Markov chain with known transition probabilities $$P\{\underline{f}_{t_k} = \underline{f}^j | \underline{f}_{t_{k-1}} = \underline{f}^i\} = p_{ij}. \quad (36)$$

To implement the Markov model—for systems with more than one possible constraint state—it is assumed that at each scan time there is a probability $p_{ij}$ that the target will make the transition from constraint state i to state j. These probabilities are assumed to be known a priori and can be expressed in the probability transition matrix as shown below.

$$P_{trans} = \begin{array}{c} \\ Prior \\ State \end{array} \begin{array}{c} New\ State \\ \begin{array}{ccc} 1 & 2 & 3 \end{array} \\ \begin{array}{c} 1 \\ 2 \\ 3 \end{array} \begin{bmatrix} p_{11} & p_{12} & p_{13} \\ p_{21} & p_{22} & p_{23} \\ p_{31} & p_{32} & p_{33} \end{bmatrix} \end{array} \quad (37)$$

The prior probability that f j is correct (f j is in effect) is $$P(\underline{f}^j|Z^0) = \mu_{t_0}^j, j=1, \ldots, N_C \quad (38)$$

where $Z^0$ is the prior information and $$\sum_{j=1}^{N^C} \mu_{t_0}^j = 1 \quad (39)$$

since the correct constraint is among the assumed $N^C$ possible constraints.

The constrained target state estimation subsystem 46 provides for determining whether the target state corresponds to a possible constrained state, and if so, then provides for determining the most likely constrained state.

One way of determining this is the multiple model filtering algorithm proposed by Bar-Shalom, wherein $N^C$ parallel filters are run simultaneously in parallel.

In another way, a multiple constraint (MC) estimation algorithm mixes and updates $N^C$ constraint-conditioned state estimates using the unconstrained state estimate $\hat{y}_{t_{kk}}^1$ as a measurement, along with the calculation of the likelihood function and probability associated with each constraint. In one embodiment of the multiple constraint (MC) estimation algorithm, the constrained state estimate output is a composite combination of all of the constraint-conditioned state estimates. If this constrained state estimate is valid, i.e. if the constrained state estimate corresponds to the unconstrained state estimate, then the target state is given by fusing the constrained and unconstrained state estimates; otherwise the target state is given by the unconstrained state estimate. This embodiment of the multiple constraint (MC) estimation algorithm comprises the following steps:

1. Estimation of state variables from multiple constraints: In step (514), using the multiple lane road equation (33) to replace the first row in equation (24), the multiple constraint state estimates are given by:

$$\hat{\underline{y}}_{t_{k|k}}^{0j} = \tag{40}$$

$$\begin{bmatrix} \overline{y} \\ \overline{\dot{y}} \\ \overline{\ddot{y}} \end{bmatrix}_{t_{k|k}} = \begin{bmatrix} B_j + \hat{C}_0 \cdot (\hat{x}^1)^2/2 + \hat{C}_1 \cdot (\hat{x}^1)^3/6 \\ \hat{C}_0 \cdot \hat{x}^1 \cdot \dot{\hat{x}}^1 + \hat{C}_1 \cdot (\hat{x}^1)^2 \cdot \dot{\hat{x}}^1/2 \\ \hat{C}_0 \cdot (\dot{\hat{x}}^1)^2 + \hat{C}_0 \cdot \hat{x}^1 \cdot \ddot{\hat{x}}^1 + \hat{C}_1 \cdot \hat{x}^1 \cdot (\dot{\hat{x}}^1)^2 + \hat{C}_1 \cdot (\hat{x}^1)^2 \cdot \ddot{\hat{x}}^1/2 \end{bmatrix}$$

where $B_j = 0, \pm B, \ldots,$ $$\pm \frac{N^C - 1}{2} B,$$

and B is the width of a lane. Stated in another way, the constraint state estimates correspond to the y locations of the centerlines of each possible lane in which the target vehicle 36 could be located.

The associated covariance is given by:

$$P_{yt_{k|k}}^{0j} = A_k^1 \cdot P_{xt_{k|k}} \cdot (A_k^1)^T + A_k^2 \cdot P_{k|k}^C \cdot (A_k^2)^T \tag{41}$$

where $A_k^1$ and $A_k^2$ are given by equation (26) and equation (27), $P_{xt_{k|k}}$ is from equation (23) and $P_{k|k}^C$ is from the curvature filter.

2. Constraint-conditioned updating: In step (516), the state estimates and covariance conditioned on a constraint being in effect are updated, as well as the constraint likelihood function, for each of the constraints $j=1, \ldots N^C$. The updated state estimate and covariances corresponding to constraint j are obtained using measurement $\hat{y}_{t_{k|k}}^1$, as follows:

$$\hat{\underline{y}}_{t_{k|k}}^j = \hat{\underline{y}}_{t_{k|k}}^{0j} + \overline{P}_{yt_{k|k}}^{0j} \left(\overline{P}_{yt_{k|k}}^{0j} + P_{yt_{k|k}}^1\right)^{-1} \left(\underline{y}_{t_{k|k}}^1 - \hat{\underline{y}}_{t_{k|k}}^{0j}\right) \tag{42}$$

$$\overline{P}_{yt_{k|k}}^j = \overline{P}_{yt_{k|k}}^{0j} - \overline{P}_{yt_{k|k}}^{0j} \left(\overline{P}_{yt_{k|k}}^{0j} + P_{yt_{k|k}}^1\right)^{-1} \overline{P}_{yt_{k|k}}^{0j}. \tag{43}$$

$$\overline{P}_{xyt_{k|k}}^j = \overline{P}_{xyt_{k|k}}^{0j} - \overline{P}_{yt_{k|k}}^{0j} \left(\overline{P}_{yt_{k|k}}^{0j} + P_{yt_{k|k}}^1\right)^{-1} \overline{P}_{xyt_{k|k}}^{0j} \tag{44}$$

3. Likelihood calculation: In step (518), the likelihood function corresponding to constraint j is evaluated at the value $\underline{y}_{t_{k|k}}^1$ of the unconstrained target state estimate, assuming a Gaussian distribution of the measurement around the constraint-conditioned state estimate for each of the constraints $j=1, \ldots, N^C$, as follows:

$$\Lambda_{t_k}^j = N\left(\underline{y}_{t_{k|k}}^1 ; \hat{\underline{y}}_{t_{k|k}}^{0j}, \overline{P}_{yt_{k|k}}^{0j} + P_{yt_{k|k}}^1\right) \tag{45}$$

wherein the Gaussian distribution $N(;,)$ has a mean value of $\hat{\underline{y}}_{t_{k|k}}^{0j}$ and an associated covariance of $\overline{P}_{yt_{k|k}}^{0j} + P_{yt_{k|k}}$.

4. Constraint Probability Evaluations: In step (520), the updated constraint probabilities are calculated for each of the constraints $j=1, \ldots NC$, as follows:

$$\mu_{t_k}^j = \frac{1}{a} \Lambda_{t_k}^j \overline{a}_j \tag{46}$$

where $\overline{\alpha}_j$, the probability after transition that constraint j is in effect, is given by $$\overline{a}_j = \sum_{i=1}^{N^C} p_{ij} \cdot \mu_{t_{k-1}}^j \tag{47}$$

and the normalizing constant is $$a = \sum_{j=1}^{N^C} \Lambda_{t_k}^j \overline{a}_j. \tag{48}$$

5. Overall state estimate and covariance: In step (522), the combination of the latest constraint-conditioned state estimates and covariances is given by:

$$\hat{\underline{y}}_{t_{k|k}} = \sum_{j=1}^{N^C} \mu_{t_k}^j \cdot \hat{\underline{y}}_{t_{k|k}}^j \tag{49}$$

$$\overline{P}_{yt_{k|k}} = \sum_{j=1}^{N^C} \mu_{t_k}^j \cdot \left[\overline{P}_{yt_{k|k}}^j + \left(\hat{\underline{y}}_{t_{k|k}}^j - \hat{\underline{y}}_{t_{k|k}}\right) \cdot \left(\hat{\underline{y}}_{t_{k|k}}^j - \hat{\underline{y}}_{t_{k|k}}\right)'\right]. \tag{50}$$

$$\overline{P}_{xyt_{k|k}} = \sum_{j=1}^{N^C} \mu_{t_k}^j \cdot \overline{P}_{xyt_{k|k}}^j \tag{51}$$

The output of the estimator from step (522) in the above algorithm is then used as the constrained estimates in the fusion process described by equations (28) and (29), and the result of equation (51), instead of the result of equation (32), is used in equation (31).

When the target vehicle 36 is not following the roadway 34 or is changing lanes, imposing the road constraint on target kinematic state variables will result in incorrect estimates that would be worse than using the associated unconstrained estimates. However, noise related estimation errors might cause a correct road constraint to appear invalid. Accordingly, it is beneficial to incorporate a means that can keep the constraints in effect when they are valid, e.g. when the target vehicle 36 follows a particular lane; and lift them off promptly when they are invalid, e.g. when the target vehicle 36 departs from its lane.

The unconstrained target state estimate plays a useful role in road constraint validation, since it provides independent target state estimates.

One approach is to test the hypothesis that the unconstrained target state estimate satisfies the road constraint equation, or equivalently, that the constrained estimate and the unconstrained estimate each correspond to the same target. The optimal test would require using all available target state estimates in history through time $t_k$ and is generally not practical. A practical approach is the sequential hypothesis testing in which the test is carried out based on the most recent state estimates only. In accordance with the notation used hereinabove, the difference between the constrained and unconstrained target state estimates (y direction only) is denoted:

$$\hat{\delta}_{t_k} = \hat{y}^1_{t_k|k} - \hat{\bar{y}}_{t_k|k} \tag{52}$$

as the estimate of $$\underline{\delta}_{t_k} = \underline{y}_{t_k} - \bar{y}_{t_k} \tag{53}$$

where $\underline{y}_t^1$ is the true target state and $\bar{y}_{t_k}$ is the true state of a target moving along the roadway 34 (or a lane). In step (524), the "same target" hypothesis is tested, i.e.

$$H_0: \delta_{t_k}=0 \tag{54}$$

vs.

$$H_1: \delta_{t_k} \neq 0 \tag{55}$$

The main filter error $$\tilde{y}_{t_k}^1 = \underline{y}_{t_k}^1 - \hat{y}_{t_k|k}^1 \tag{56}$$

is assumed independent of the error $$\tilde{\bar{y}}_{t_k} = \bar{y}_{t_k} - \hat{\bar{y}}_{t_k|k} \tag{57}$$

which is from the constraints. The covariance of the difference $\delta_{t_k}$ is, under hypothesis $H_0$, given by:

$$P_{t_k}^\delta = E(\delta_{t_k}\delta_{t_k}') = E[(\tilde{y}_{t_k}^1 - \tilde{\bar{y}}_{t_k})(\tilde{y}_{t_k}^1 - \tilde{\bar{y}}_{t_k})'] \tag{58}$$

Assuming that the estimation errors are Gaussian, the test of $H_0$ vs. $H_1$ is as follows:

Accept $H_0$ if $$\rho_{t_k} = \delta_{t_k}(P_{t_k}^\delta)^{-1}\delta_{t_k} \leq \gamma \tag{59}$$

The threshold is chosen such that $$P(\rho_{t_k} > \gamma | H_0) = \alpha \tag{60}$$

where α is a predefined error tolerance value. Note that based on the above Gaussian error assumption, $\rho_{t_k}$ has a chi-square distribution with $n_y$ degrees of freedom. The choice of this threshold is a significant design factor and should be based on specific application need. In road vehicle collision prediction, a target in the host lane 38 is regarded to be on a collision course and is considered more dangerous than a target in one of the neighboring lanes 40. Thus it is desirable to have a high threshold (a low error tolerance value) for a target in host lane 38 since constrained filtering can provide accurate target state estimates while a "changing lane" maneuver of such a target will not pose a threat to the host vehicle 12. On the other hand, targets in neighboring lanes 40 are usually regarded as passing-by vehicles. Though constrained filtering may further reduce false alarm rate, a "changing lane" maneuver of such a target (into the host lane 38) would pose a real threat to the host vehicle 12. Thus it is desirable to have a low threshold (a high error tolerance value) for a target in a neighboring lane if false alarm rate is already low enough.

Based on the above analysis, the hypothesis testing scheme efficiently uses different threshold values for targets in different lanes, with the multiple constraint filtering algorithm providing the knowledge of which lane the target is most likely in currently. Assuming that there are $N^C$ possible lanes on the roadway 34, and each lane is described by a constraint equation, the constraint equation with the highest probability $\mu_{t_k}^j$ for a target corresponds to the lane that this target in most likely in at time tk (the current time). Denoting this most likely lane as $l_t$, then $$\mu_{t_k}^{l_t} = \max_j \{\mu_{t_k}^j, j=1, \ldots, r\}. \tag{61}$$

The difference between the unconstrained state estimates and lane $l_t$ constrained state estimates (y direction only), denoted as:

$$\hat{\delta}_{t_k}^{l_t} = \hat{y}_{t_k|k}^1 - \hat{\bar{y}}_{t_k|k}^{l_t} \tag{62}$$

is the estimate of $$\underline{\delta}_{t_k}^{l_t} = \underline{y}_{t_k}^1 - \bar{y}_{t_k}^{l_t} \tag{63}$$

where $\underline{y}_t^1$ is the true target state and $\bar{y}_{t_k}^{l_t}$ is the true state of a target moving along lane $l_t$. The test for the "same target" hypothesis is then given by:

$$H_0: \underline{\delta}_{t_k}^{l_t} = 0 \tag{64}$$

vs.

$$H_1: \underline{\delta}_{t_k}^{l_t} \neq 0 \tag{65}$$

The constrained estimation error is given by:

$$\tilde{\bar{y}}_{t_k}^{l_t} = \bar{y}_{t_k} - \hat{\bar{y}}_{t_k|k}^{l_t} \tag{66}$$

Assuming that the estimation errors are independent and Gaussian, the test of $H_0$ vs. $H_1$ becomes:

Accept $H_0$ if $$\rho_{t_t}^{l_t} = (\delta_{t_k}^{l_t})'(P_{t_k}^{\delta_r})^{-1}\delta_{t_k}^{l_t}\gamma_{l_t} \tag{67}$$

where $$P_{t_k}^{\delta_t} = E[(\delta_{t_k}^{l_t} - \hat{\delta}_{t_k}^{l_t})(\delta_{t_k}^{l_t} - \hat{\delta}_{t_k}^{l_t})'] = E[(\tilde{y}_{t_k}^1 - \tilde{\bar{y}}_{t_k}^{l_t})(\tilde{y}_{t_k}^1 - \tilde{\bar{y}}_{t_k}^{l_t})'] \tag{68}$$

$$= P_{y t_k|k}^1 + P_{y t_k|k}^{l_t}$$

and the threshold is such that $$P(\rho_{t_k}^{l_t} > \gamma_{l_t} | H_0, l^t) = \alpha_{l_t} \tag{69}$$

where $$\gamma_{l_t} \in \{\gamma_j\}_{j=1}^r \text{ and } \alpha_{l_t} \in \{\alpha_j\}_{j=1}^r \qquad (70)$$

Such a lane adaptive hypothesis testing scheme provides for a prompt switch of the target state estimation output to the unconstrained estimate when the target vehicle 36 leaves its current lane, while the estimation accuracy of a target in host lane 38 is substantially improved by constrained filtering.

In another embodiment of the multiple constraint (MC) estimation algorithm, the constrained state estimate used for the hypothesis testing is the most likely of the separate constrained target state estimates (i.e. in accordance with a "winner take all" strategy), rather than a composite combination of all of the constrained target state estimates. If this most likely constrained state estimate is valid, i.e. if the most likely constrained state estimate corresponds to the unconstrained state estimate, then the target state is given by fusing the most likely constrained state estimate and the unconstrained state estimate; otherwise the target state is given by the unconstrained state estimate.

In yet another embodiment of the multiple constraint (MC) estimation algorithm, hypothesis tests are made for each of the constrained state estimates. If none of the hypotheses are satisfied, then the target state is given by the unconstrained state estimate. If one of the hypotheses is satisfied, then the target state is given by fusing the corresponding constrained state estimate and the unconstrained state estimate. If more than one hypotheses are satisfied, then the most likely constrained state may be identified by voting results from a plurality of approaches, or by repeating the hypothesis tests with different associated thresholds.

Generally, the number of constraints (i.e. the number of roadway lanes) can vary with respect to time, as can associated parameters therewith, for example, the width of the lanes of the roadway, so as to accommodate changes in the environment of the host vehicle 12. For example, the host vehicle 12 in one trip could travel on a one-lane road, a two-lane road with opposing traffic, a three-lane road with a center turn lane, a four line road two lanes of opposing traffic, or on a multi-lane divided freeway.

Road vehicle tracking simulations using constrained and unconstrained filtering were carried out for four scenarios. In all scenarios, the host vehicle 12 was moving at 15.5 m/s and a target vehicle 36 is approaching on the same roadway 34 at a speed of 15.5 m/s. The initial position of the target was 125 meters away from the host in the x direction, and the lane width for all lanes was assumed to be 3.6 meters. The measurement variance of the vehicle speed sensor was 0.02 m/s and the variance of the gyroscope yaw rate measurement was 0.0063 rad/s. The variances of radar range, range rate and azimuth angle measurements were 0.5 m, 1 m/s, and 1.5° respectively. Simulation results were then generated from 100 Monte-Carlo runs of the associated tracking filters.

Figure 9A:
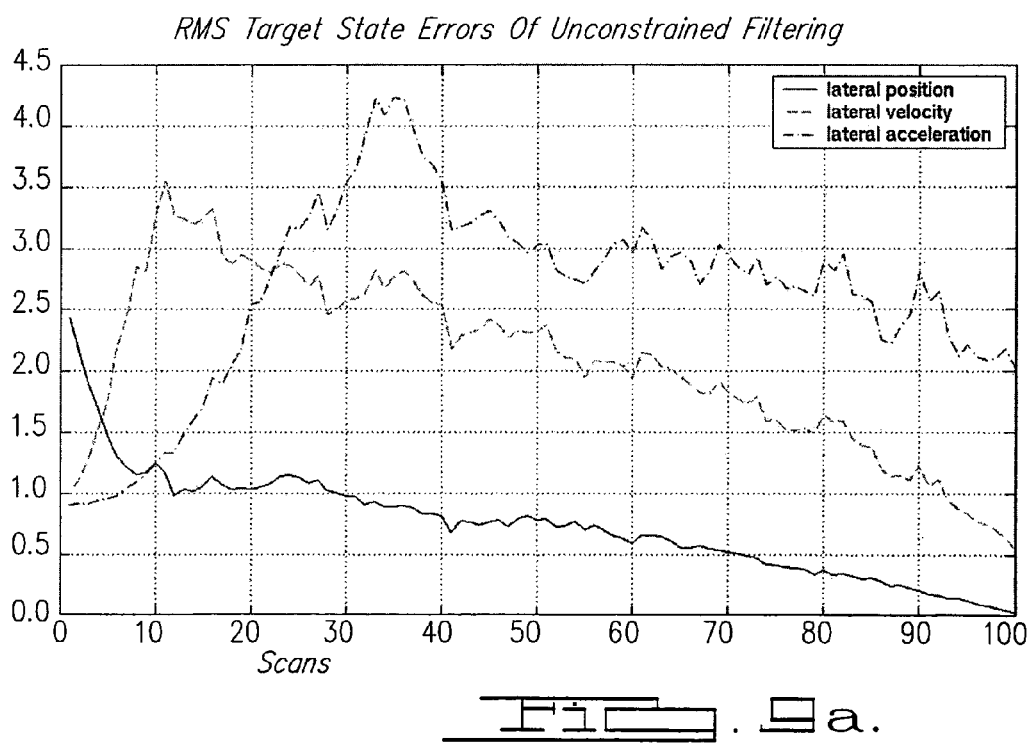
FIGS. 9a–b illustrate an example of the target state RMS errors from unconstrained and constrained filtering on the straight roadway, corresponding to FIGS. 8a–d.
Figure 9B:
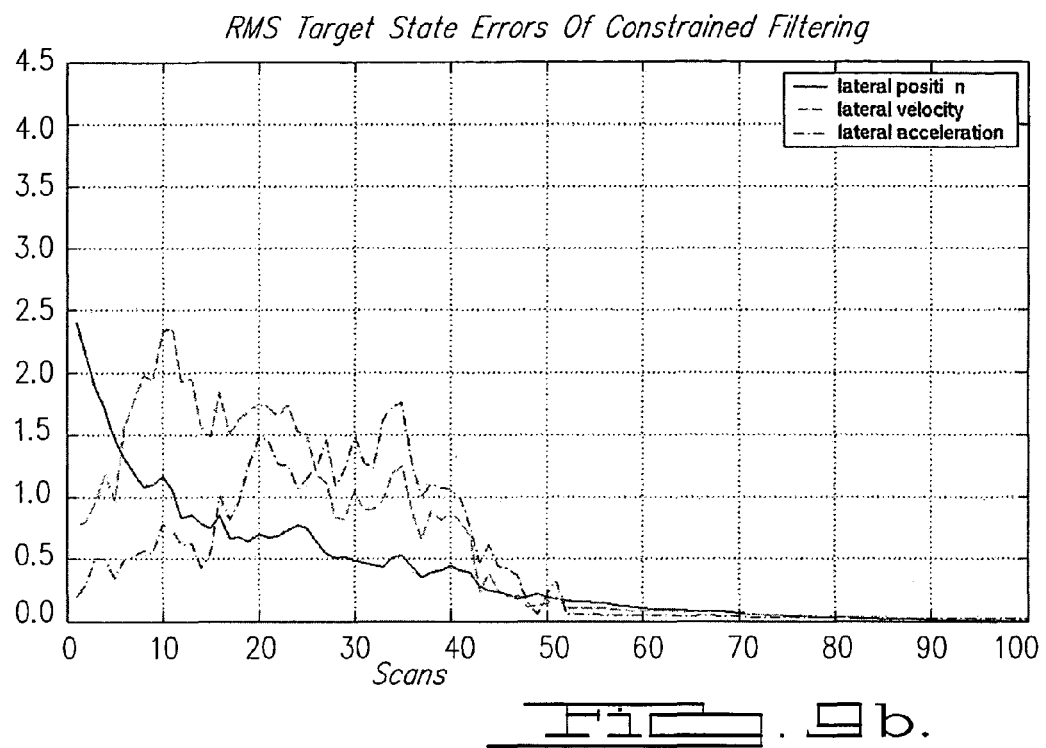
Figure 10A:
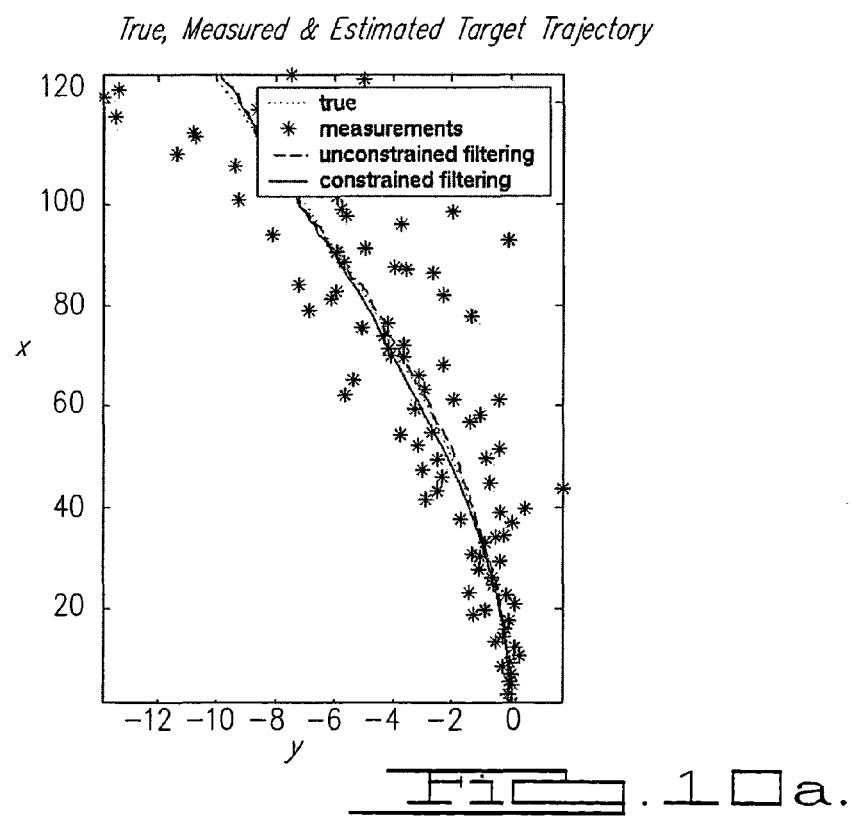
FIGS. 10a–d illustrate an example of the estimation of target position, lateral velocity, and road curvature parameters for a curved roadway.
Figure 10B:
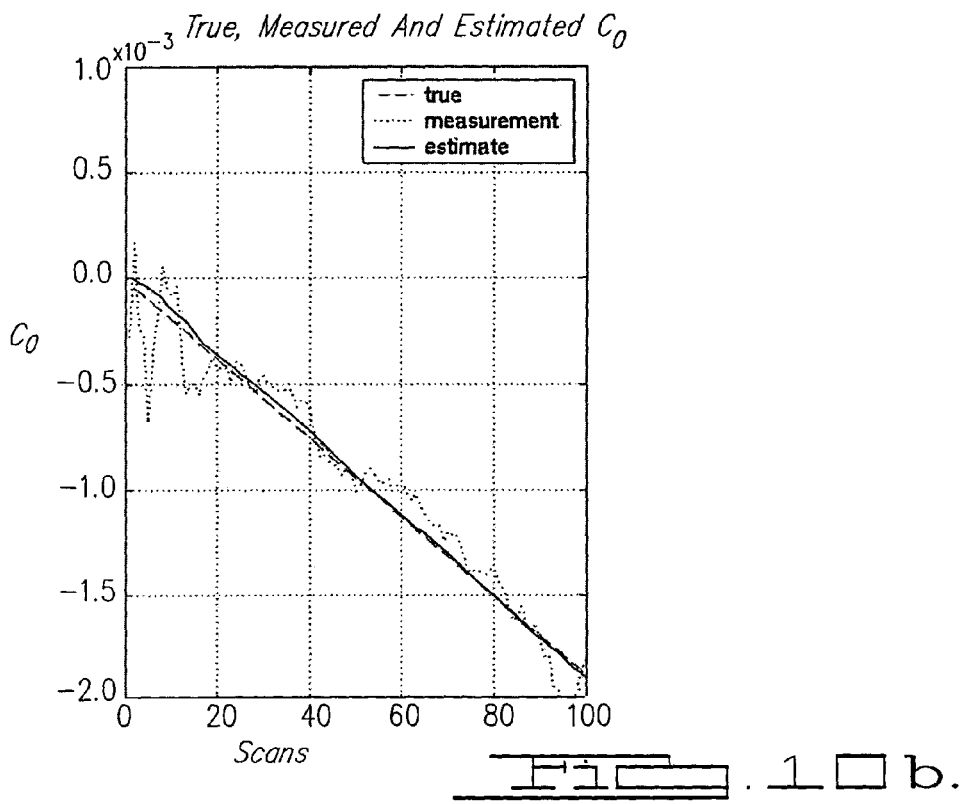
Figure 10C:
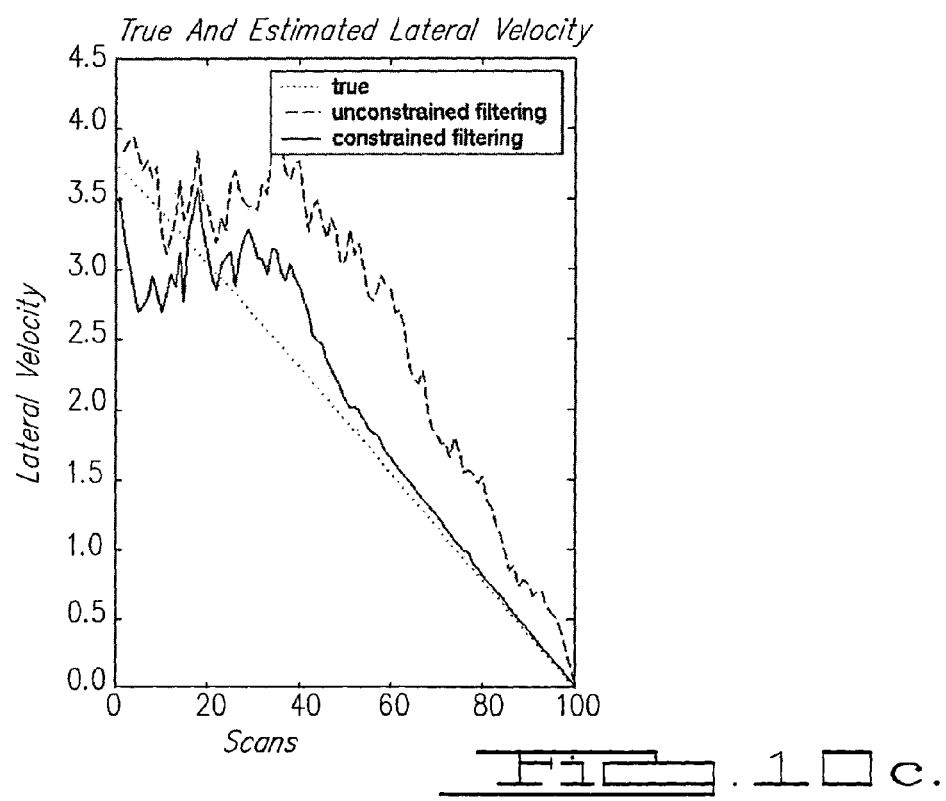
Figure 10D:
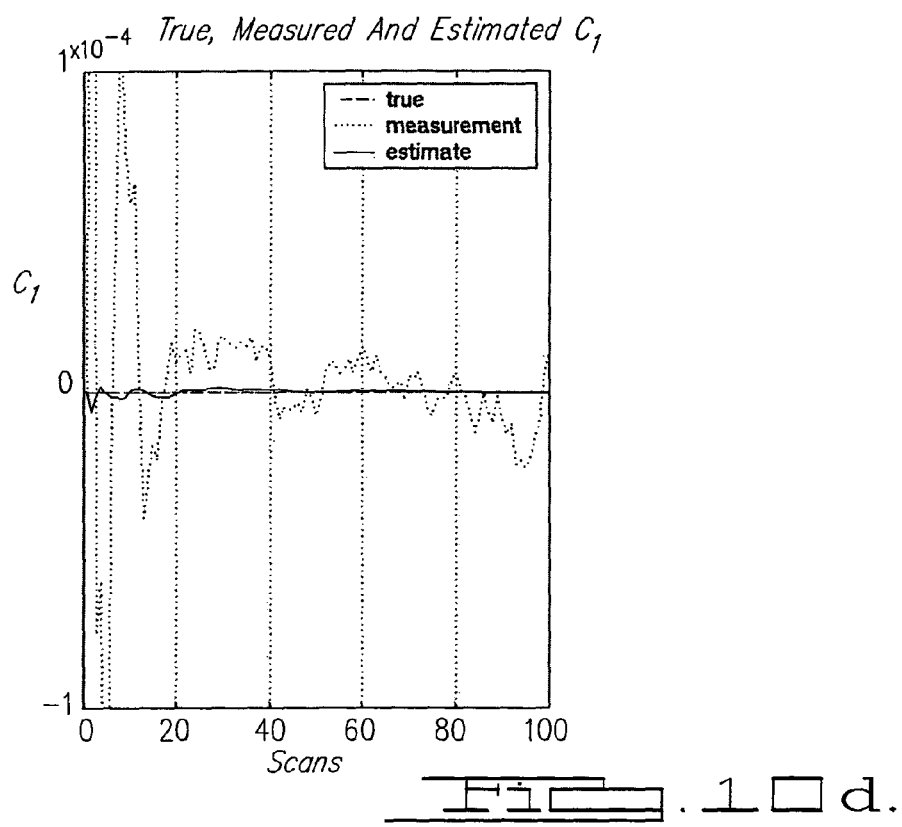

In the first scenario, the host vehicle 12 and the target vehicle 36 were moving on a straight roadway 34 ($C_0=0$ and $C_1=0$) and the target vehicle 36 was moving toward the host vehicle 12 in the same lane. FIGS. 8a–d illustrate the target state estimation and road curvature estimation results of the unconstrained and constrained filtering schemes, and FIGS. 9a–b illustrate the average target vehicle 36 lateral position, velocity and acceleration RMS errors of the unconstrained and constrained filtering schemes. The estimation errors from constrained filtering were substantially reduced. Before 48 radar scans, when the target vehicle 36 was farther than 65 meters away from the host vehicle 12, constrained filtering resulted in a more than 40 percent reduction of error in target lateral velocity estimation, and a more than 60 percent reduction of error in lateral acceleration estimation. When the target vehicle 36 was less than 65 meters away from the host vehicle 12, which is a more relevant condition for collision prediction, more than 50 percent of lateral position estimation error, and more than 90 percent of lateral velocity and acceleration estimation errors, were reduced by constrained filtering.

Figure 11A:
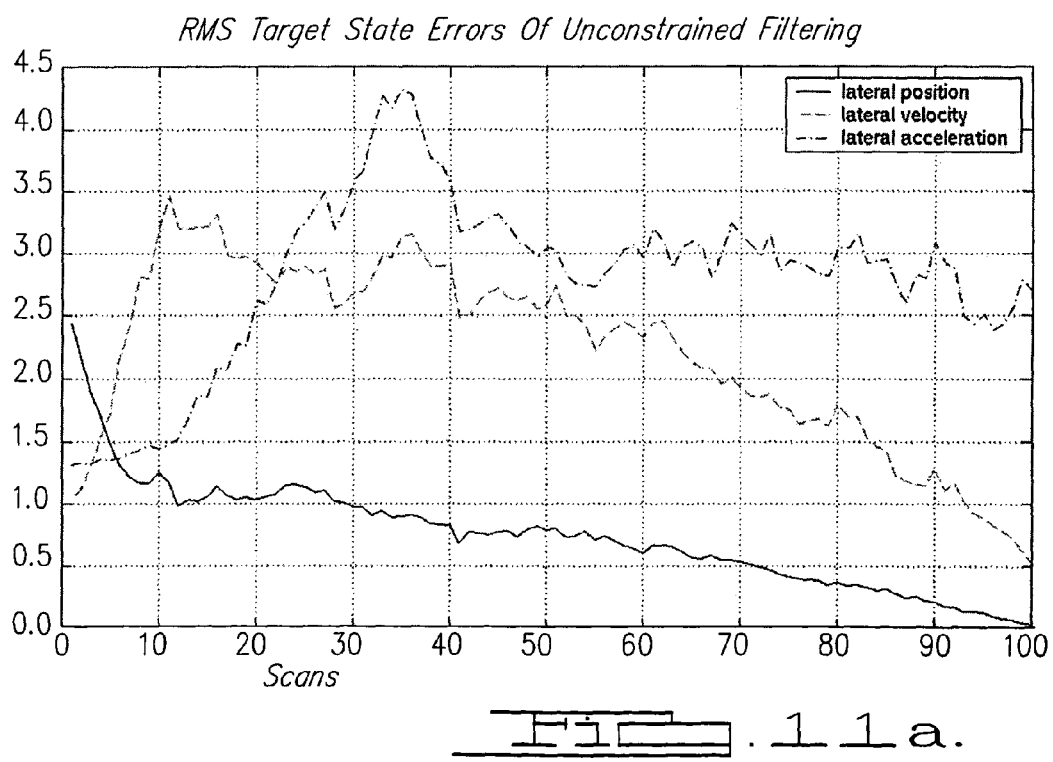
FIGS. 11a–b illustrate an example of the target state RMS errors from unconstrained and constrained filtering for the curved roadway, corresponding to FIGS. 10a–d.
Figure 11B:
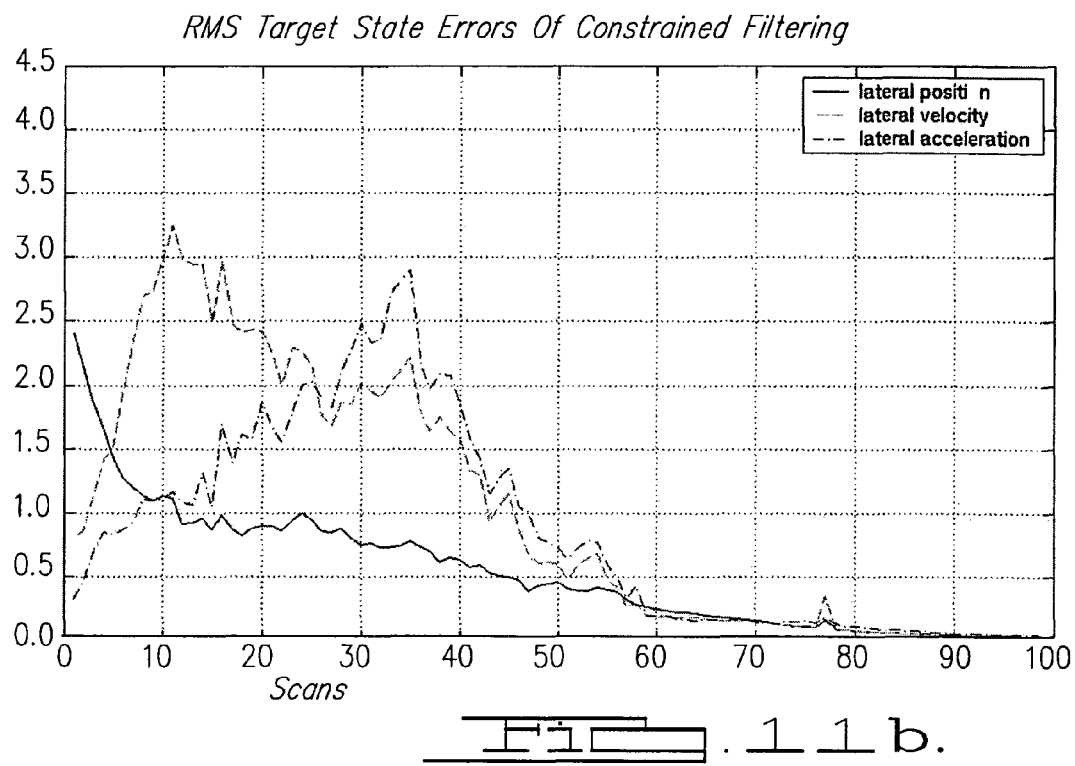
Figure 12A:
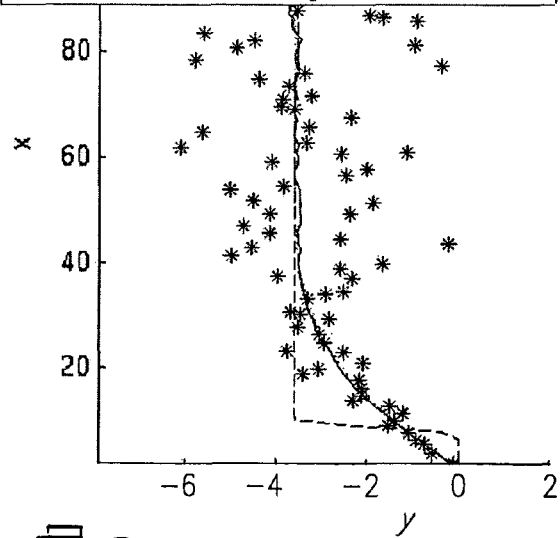
FIGS. 12a–d illustrate an example of the estimation of target position, lateral velocity, and associated RMS errors for a straight roadway involving a lane change.
Figure 12B:
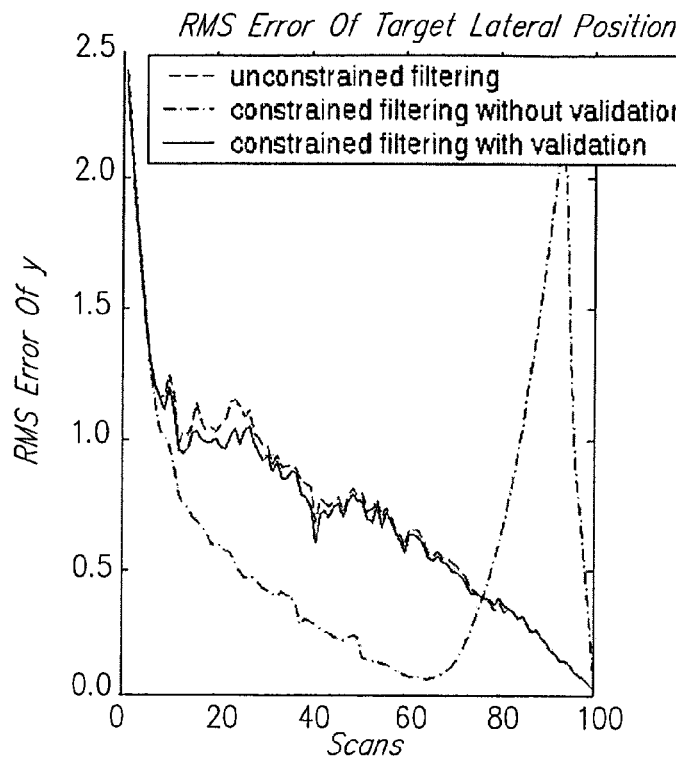
Figure 12C:
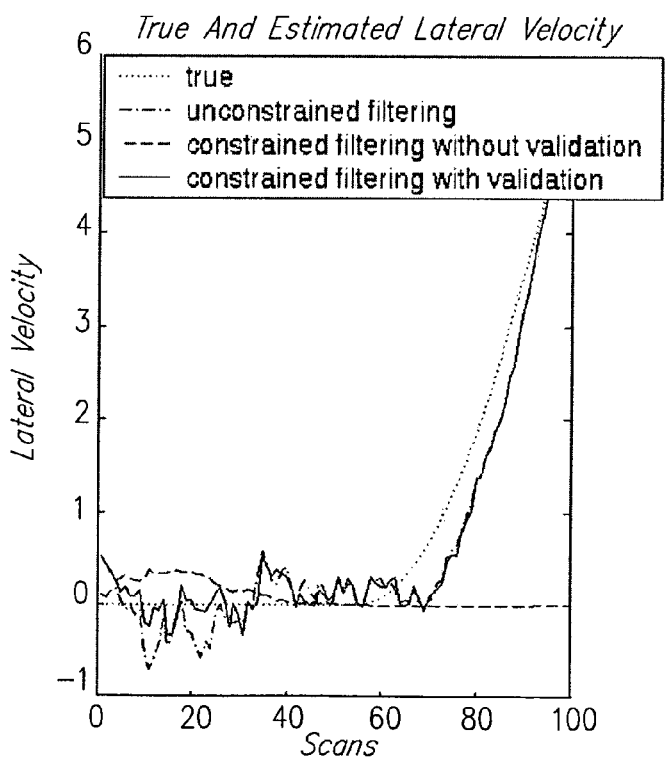
Figure 12D:
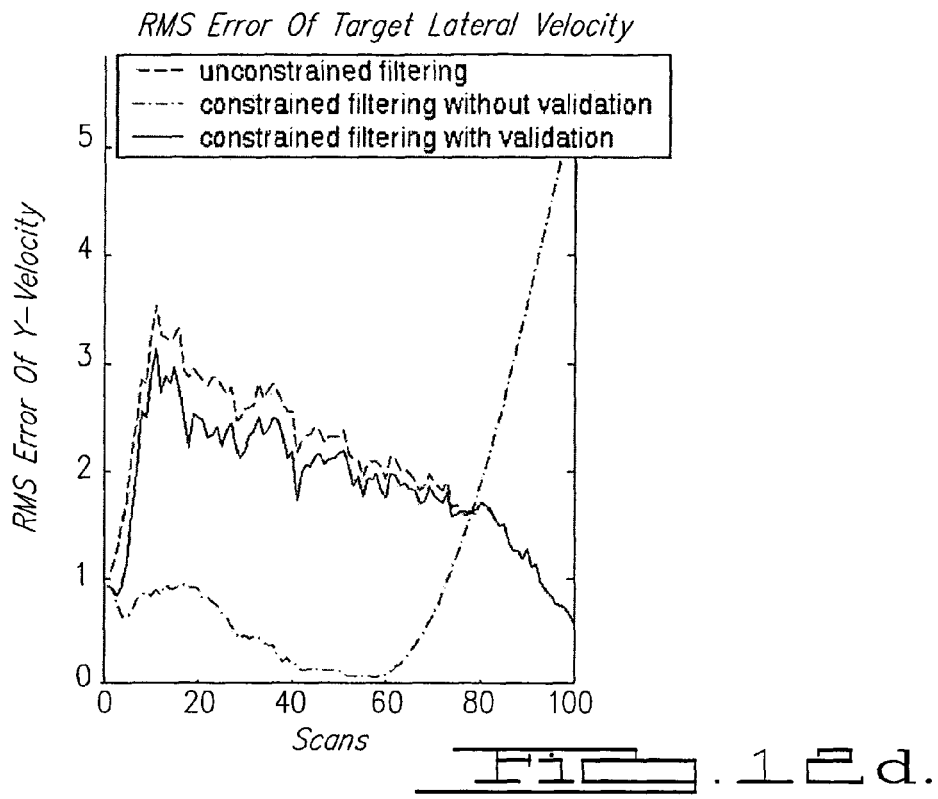
Figure 13A:
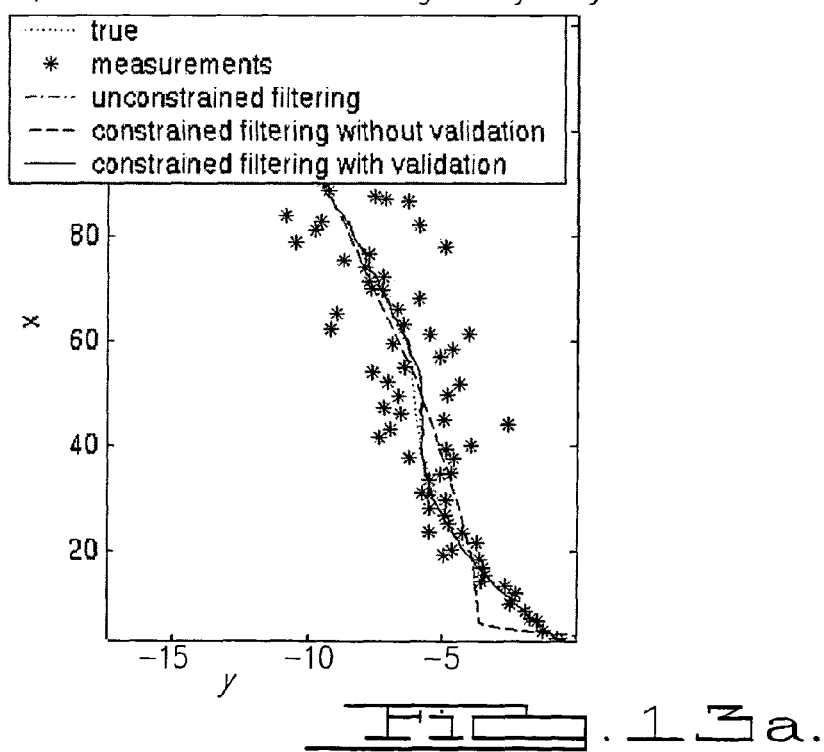
FIGS. 13a–d illustrates an example of the estimation of target position, lateral velocity, and their RMS errors for a curved roadway involving a lane change.
Figure 13B:
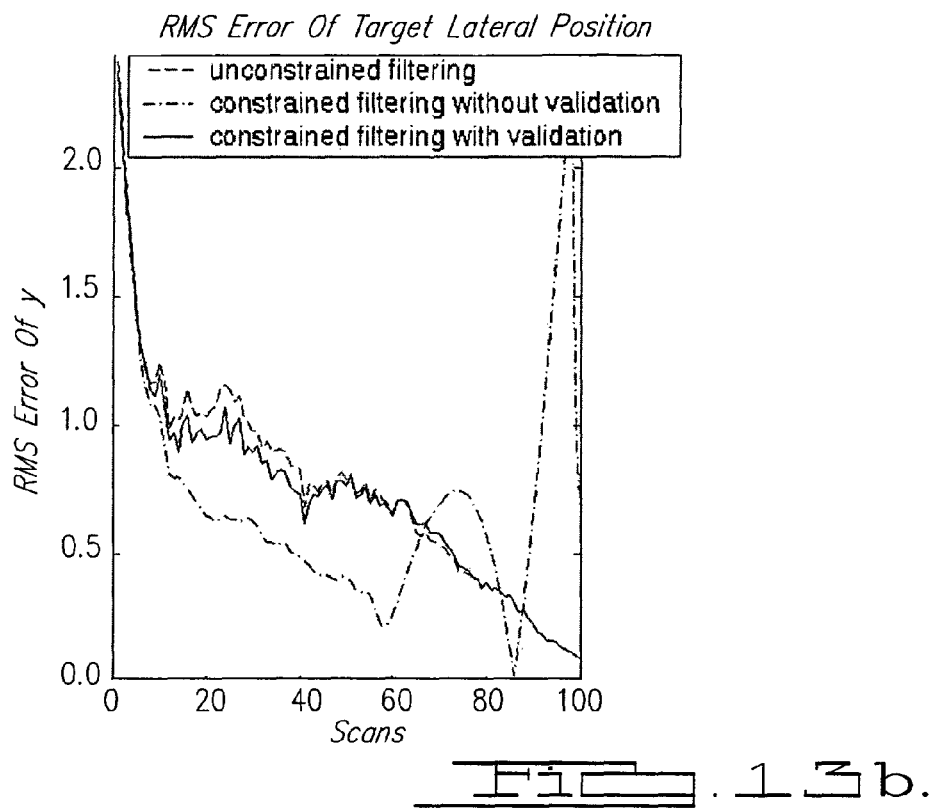
Figure 13C:
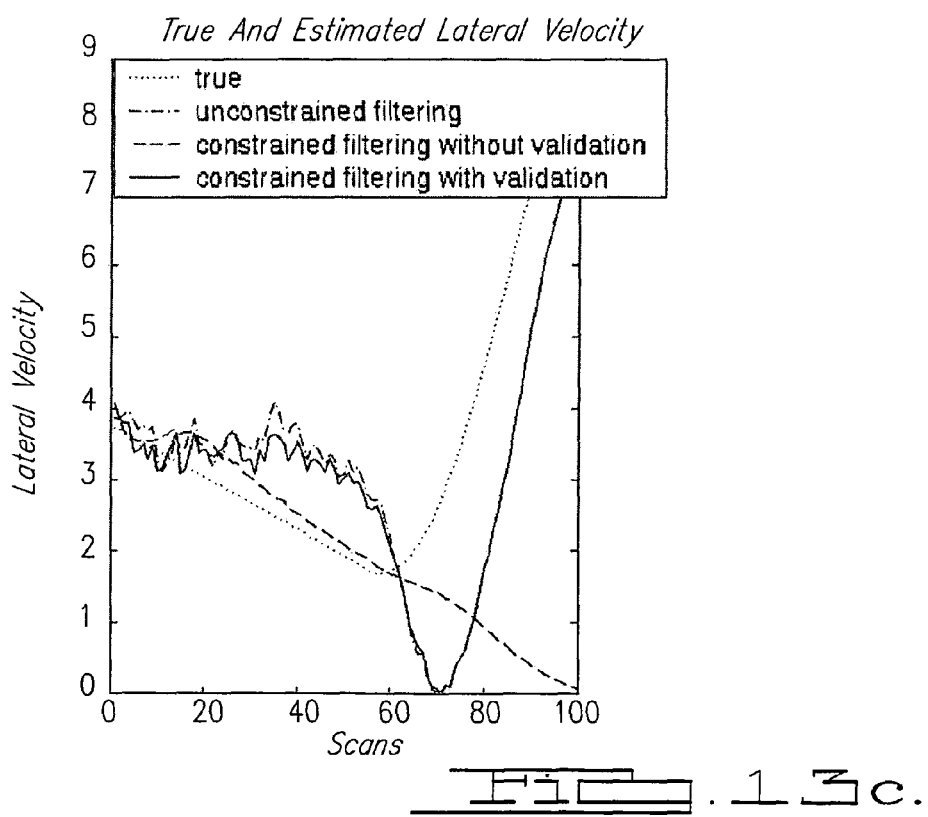
Figure 13D:
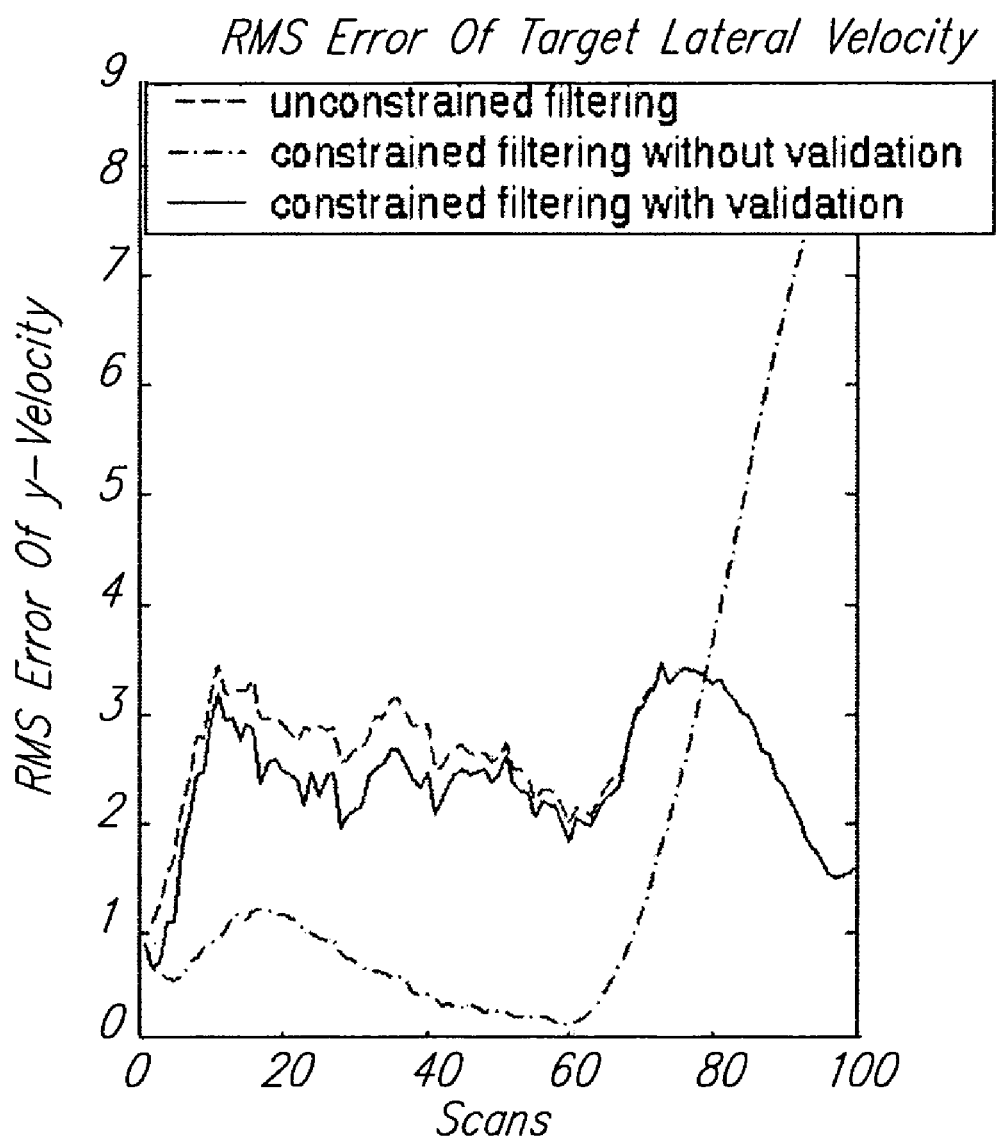

In the second scenario, the host vehicle 12 and the target vehicle 36 were moving on a curved roadway 34 ($C_0=-10^{-5}$ and $C_1=-3\times10^{-5}$) and the target vehicle 36 was moving toward the host vehicle 12 in the same lane. FIGS. 10a–d illustrate the target state estimation and curvature estimation results of the unconstrained and constrained filtering schemes, and FIGS. 11a–b illustrate the average target vehicle 36 lateral position, velocity and acceleration RMS errors of the unconstrained and constrained filtering schemes. The estimation errors from constrained filtering were substantially reduced after about 48 radar scans, when the target vehicle 36 was less than 65 meters away from the host vehicle 12. Estimation errors were the same for constrained and unconstrained filtering before 20 radar scans, when the target vehicle 36 was about 100 meters away from the host vehicle 12. For the target vehicle 36 located between 100 and 65 meters away from the host vehicle 12, constrained filtering resulted in about a 30 percent reduction in errors of lateral velocity and acceleration estimation, and when the target vehicle 36 was less than 65 meters away from the host vehicle 12, more than 50 percent of lateral position estimation error and more than 90 percent of lateral velocity and acceleration estimation errors were reduced by constrained filtering. The lack of improvement for constrained filtering when the target vehicle 36 was far away resulted from estimation errors of road curvature parameters, which caused constraint errors proportional to the distance between host vehicle 12 and the target vehicle 36. This is more evident in the curved roadway 34 case, where curvature estimation error was larger and caused more lane position ambiguity of a distant target vehicle 36.

In the third scenario, the host vehicle 12 and the target vehicle 36 were moving on a straight roadway 34 ($C_0=0$ and $C_1=0$) and the target vehicle 36 was initially approaching in the left neighboring lane. At t=2.2 second (55 radar scans), the target vehicle 36 began to diverge from its lane and turns toward the host lane 38, which resulted in a collision at t=4 seconds (100 radar scans). FIGS. 12a–d illustrate the target state estimation results and the lateral position and velocity RMS errors of the unconstrained and constrained filtering schemes. The error tolerance levels for constraint validity hypothesis testing (equation (69)) were chosen as $\alpha \approx 1$ for the host lane 38 and $\alpha=0.5$ for all neighboring lanes 40. Whereas constrained filtering without validation produces substantially lower estimation errors before the target vehicle 36 turns away, the associated target state estimation result was incorrect and its RMS errors were much larger than that of unconstrained filtering after the target vehicle 36 began to turn away from its lane (the left neighboring lane), implying that the road constraints, which become invalid after the target vehicle 36 began to diverge from its lane, were not promptly lifted off. On the other hand, the performance of constrained filtering with validation was substantially close to that of unconstrained filtering, producing slightly lower estimation errors before the target vehicle 36 turns away, and exhibiting target state estimation results and RMS errors that were the same as unconstrained filtering after the target vehicle 36 began to turn away from its lane, implying that road constraints were promptly lifted off after the target vehicle 36 began to diverge from its lane.

The fourth scenario was similar to the third scenario, the only difference being that the vehicles were on a curved roadway 34 ($C_0=-10^{-5}$ and $C_1=-3\times10^{-5}$) instead of a straight one. The target vehicle 36 began to diverge at t=2.2 s and results in a collision at t=4 s. FIGS. 13a–d illustrate the target state estimation results and the lateral position and velocity RMS errors of the unconstrained and constrained filtering schemes. The error tolerance levels were the same as in the third scenario, and the results and observations were also similar to that of the third scenario. Road constraints were promptly lifted off by the proposed constraint validation after the target vehicle 36 began to diverge from its lane. In general, the overall improvement by constrained filtering in estimation accuracy of target vehicle 36 lateral kinematics was substantial, given the fact that estimation accuracy of target vehicle 36 lateral kinematics was often limited by poor radar angular resolution.

Accordingly, simulation results of road vehicle tracking on both straight and curved roadways 34 show that the predictive collision sensing system 10 could substantially reduce the estimation errors in target vehicle 36 lateral kinematics when the target vehicles 36 were in the host lane 38. When a target vehicle 36 maneuvers from a neighboring lane into the host lane 38, the predictive collision sensing system 10 promptly detects this maneuver and lifts off the road constraint to avoid an otherwise incorrect constrained result. In view of the fact that poor radar angular resolution often results in poor lateral kinematics estimation, the predictive collision sensing system 10 has provided for a substantial improvement in estimation accuracy of target vehicle 36 lateral kinematics, which is beneficial for an early and reliable road vehicle collision prediction. While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

Appendix—Description of Kalman Filtering

A Kalman filter is used to estimate, from a set of noisy measurements, the state and associated measurements of a dynamic system subject to noise.

The system dynamics are defined by:

$$\underline{x}_{k+1}=F_k\cdot\underline{x}_k+\underline{w}_k \sim N(0, Q_k) \quad \text{(A-1)}$$

where $\underline{x}_k$ is the system state vector, $F_k$ is the system matrix and $\underline{w}_k$ an associated vector of noise variables corresponding to each state variable, each noise variable having a mean value of zero, and a variance given by the corresponding element of the associated variance vector, $Q_k$.

The dynamics of the associated system measurements are given by:

$$\underline{z}_k=H_k\cdot\underline{x}_k+\underline{v}_k \quad \underline{v}_k \sim N(0, R_k) \quad \text{(A-2)}$$

where $\underline{z}_k$ is the system measurement vector, $H_k$ is the measurement matrix and $\underline{v}_k$ an associated vector of noise variables corresponding to each measurement variable, each noise variable having a mean value of zero, and a variance given by the corresponding element of the associated variance covariance matrix, $R_k$. The values of the elements of the associated covariance matrix $R_k$ can be determined a priori from analysis of the representative measurements of the associated system for associated representative sets of operating conditions. The values of the elements of the associated covariance matrix $Q_k$ account for modeling errors. Generally, the associated matrices $F_k$, $Q_k$, $H_k$, $R_k$ can vary over time.

Given a measurement $\underline{z}_k$ at time k, and initial values of the state $\underline{x}_{k-1|k-1}$ and associated covariance $P_{k-1|k-1}$ at time k-1, the Kalman filter is used to to estimate the associated state $\underline{x}_{k|k}$ and associated covariance $P_{k|k}$ at time k.

The first step in the filtering process is to calculate estimates of the state $x_{k|k-1}$ and associated covariance $P_{k-1|k-1}$ at time k based upon estimates at time k−1, as follows:

$$\underline{x}_{k|k-1}=F_k\cdot\underline{x}_{k-1|k-1} \quad \text{(A-3)}$$

$$P_{k|k-1}=F_k\cdot P_{k-1|k-1}\cdot F_k^T+Q_k \quad \text{(A-4)}$$

The next step is to predict the measurement $\hat{z}_k$ and associated covariance matrix $S_k$ at time k, as follows:

$$\hat{z}_k=H_k\cdot\underline{x}_{k|k-1} \quad \text{(A-5)}$$

$$S_k=\text{cov}(\hat{z}_k)=H_k\cdot P_{k|k-1}\cdot H_k^T+R_k \quad \text{(A-6)}$$

The next step is to calculate a gain matrix $G_k$ used for updating the state vector $\underline{x}_{k|k}$ and associated covariance matrix $P_{k|k}$, as follows:

$$G_k=P_{k|k-1}\cdot H_k^T\cdot S_k^{-1} \quad \text{(A-7)}$$

Finally, the state vector $\underline{x}_{k|k}$ and associated covariance matrix $P_{k|k}$ are estimated at time k, responsive to the associated measurement $\underline{z}_k$, as follows:

$$\underline{x}_{k|k}=\underline{x}_{k|k-1}+G_k\cdot(\underline{z}_k-\hat{z}_k) \quad \text{(A-8)}$$

$$P_{k|k}=P_{k|k-1}-G_k\cdot S_k\cdot G_k^T \quad \text{(A-9)}$$

We claim:

1. A method of estimating a state of a target vehicle on a roadway, comprising:
   a. generating an estimate of a curvature of the roadway;
   b. estimating an unconstrained state and associated covariance thereof of the target vehicle;
   c. establishing at least one prospective constraint of the target vehicle, wherein at least one prospective constraint is responsive to said estimate of the curvature of the roadway;
   d. estimating at least one constrained state and associated covariance thereof of the target vehicle corresponding to said at least one prospective constraint of the target vehicle;
   e. determining a most likely state of the target vehicle, wherein said most likely state of the target vehicle is selected from said unconstrained state of the target vehicle and said at least one constrained state of the target vehicle; and
   f. if said at least one constrained state of the target vehicle is the most likely state, then fusing the unconstrained state and covariance thereof of the target vehicle with the associated constrained state and covariance of said most likely state and outputting at least one of the fused state and the associated fused covariance thereof of the target as the estimated state or covariance of the target;

otherwise outputting at least one of the unconstrained state and the associated unconstrained covariance thereof of the target as the estimated state or covariance of the target.

2. A method of estimating a state of a target vehicle on a roadway as recited in claim 1, wherein the operation of estimating the curvature of the roadway comprises:
   a. generating a speed measurement by measuring a longitudinal speed of a host vehicle traveling on the roadway;
   b. generating a yaw rate measurement by measuring or determining a yaw rate of said host vehicle; and
   c. estimating at least one curvature parameter, wherein said at least one curvature parameter is representative of a curvature of the roadway, and the operation of estimating at least one curvature parameter is responsive to said speed measurement and is responsive to said yaw rate measurement.

3. A method of estimating a state of a target vehicle on a roadway as recited in claim 2, wherein said at least one curvature parameter comprises at least one parameter of a clothoid model of curvature, and said Clothoid model of curvature is referenced to a coordinate system of said host vehicle.

4. A method of estimating a state of a target vehicle on a roadway as recited in claim 3, wherein said at least one curvature parameter comprises first and second parameters of a clothoid model, wherein said first parameter is a constant, and said second parameter is a sensitivity of curvature to a distance along the roadway.

5. A method of estimating a state of a target vehicle on a roadway as recited in claim 2, wherein the operation of estimating at least one curvature parameter comprises processing said measurements of speed and yaw rate with at least one Kalman filter.

6. A method of estimating a state of a target vehicle on a roadway as recited in claim 5, wherein said at least one Kalman filter comprises first and second Kalman filters, said first Kalman filter is adapted to estimate a first set of state variables from said speed measurement and from said yaw rate measurement, and said second Kalman filter is adapted to estimate said at least one curvature parameter from said estimate of said first set of state variables.

7. A method of estimating a state of a target vehicle on a roadway as recited in claim 6, wherein said first set of state variables comprises vehicle velocity, vehicle acceleration, vehicle yaw rate and vehicle yaw acceleration.

8. A method of estimating a state of a target vehicle on a roadway as recited in claim 1, wherein the operation of estimating an unconstrained state and associated covariance of the target vehicle comprise:
   a. measuring a range, a range rate and an azimuth of the target vehicle relative to a host vehicle; and
   b. estimating said unconstrained state of the target vehicle from said measurements of the range, range rate and azimuth of the target vehicle relative to the host vehicle.

9. A method of estimating a state of a target vehicle on a roadway as recited in claim 1, further comprising the operation of transforming said unconstrained state of the target vehicle to a coordinate system corresponding to said estimate of the curvature of the roadway.

10. A method of estimating a state of a target vehicle on a roadway as recited in claim 1, wherein said at least one prospective constraint of the target vehicle is applied to a lateral position of the target vehicle, and a longitudinal position of the target vehicle is unconstrained.

11. A method of estimating a state of a target vehicle on a roadway as recited in claim 1, wherein said at least one prospective constraint of the target vehicle comprises a plurality of prospective constraints, and at least two different prospective constraints correspond to different lanes of the roadway.

12. A method of estimating a state of a target vehicle on a roadway as recited in claim 1, wherein the operation of determining the most likely state of the target vehicle comprises:
   a. determining at least one likelihood value, wherein said a least one likelihood value corresponds to said at least one prospective constraint of the target vehicle being active and said at least one likelihood value is responsive to a corresponding at least one distribution function evaluated at a value corresponding to said unconstrained state of the target vehicle;
   b. determining a probability of a first constrained state of the target vehicle, wherein said probability is responsive to said at least one likelihood value;
   c. testing at least one hypothesis that said unconstrained state of the target vehicle corresponds to said first constrain state, and
   d. identifying a most likely state of the target vehicle responsive to the operation of testing said at least one hypothesis.

13. A method of estimating a state of a target vehicle on a roadway as recited in claim 12, wherein the operation of determining the most likely state of the target vehicle comprises establishing at least one a priori probability of a transition from a first state to a second state of the target vehicle, wherein said first and second states can be either the same or different states, and, said probability of said first constrained state of the target vehicle is responsive to said at least one a priori probability.

14. A method of estimating a state of a target vehicle on a roadway as recited in claim 12, wherein said at least one distribution function is responsive to said covariance of the particular constrained state of the target vehicle.

15. A method of estimating a state of a target vehicle on a roadway as recited in claim 12, wherein said at least one constrained state comprises a plurality of constrained states, and said first constrained state comprises a combination of said plurality of constrained states.

16. A method of estimating a state of a target vehicle on a roadway as recited in claim 12, wherein said first constrained state comprises a most likely of said at least one constrained state of the target vehicle.

17. A method of estimating a state of a target vehicle on a roadway as recited in claim 12, wherein said first constrained state comprises one of said at least one constrained state of the target vehicle.

18. A method of estimating a state of a target vehicle on a roadway as recited in claim 12, wherein the operation of testing at least one hypothesis is responsive to the most recent estimates of said state of the target vehicle.

19. A method of estimating a state of a target vehicle on a roadway as recited in claim 12, wherein the operation of testing at least one hypothesis comprises identifying a particular constrained state of the target vehicle corresponding to a most likely of said at least one constrained state of the target vehicle, calculating a value of a function responsive to a difference between said strained state and said particular constrained state, and comparing said value of said function with a threshold, whereby said hypothesis is satisfied if said value of said function is less than said threshold.

20. A method of estimating a state of a target vehicle on a roadway as recited in claim 19, wherein said threshold is responsive to the particular constraint associated with said particular constrained state of the target vehicle.

21. A method of estimating a state of a target vehicle on a roadway as recited in claim 20, wherein said threshold is relatively lower for said particular constrained state corresponding to an increased threat by the target vehicle to host vehicle.

22. A method of estimating a state of a target vehicle on a roadway as recited in claim 21, wherein said particular constrained state corresponding to an increased threat by the target vehicle to the host vehicle is selected from the target vehicle moving in the same lane as the host vehicle, and the target vehicle changing lanes to said same lane as the host vehicle.

\* \* \* \* \*